(12) United States Patent
Phanco et al.

(10) Patent No.: US 10,690,152 B1
(45) Date of Patent: *Jun. 23, 2020

(54) FLUID EXPANSION TANK

(71) Applicant: Hydro-Gear Limited Partnership, Sullivan, IL (US)

(72) Inventors: Eric S. Phanco, Plainfield, IN (US); Bryan K. Sparks, Charleston, IL (US); Gregory Barton Moebs, Avon, IN (US)

(73) Assignee: Hydro-Gear Limited Partnership, Sullivan, IL (US)

(*) Notice: Subject to any disclaimer, the term of this patent is extended or adjusted under 35 U.S.C. 154(b) by 147 days.

This patent is subject to a terminal disclaimer.

(21) Appl. No.: 15/846,866

(22) Filed: Dec. 19, 2017

Related U.S. Application Data

(60) Provisional application No. 62/436,154, filed on Dec. 19, 2016.

(51) Int. Cl.
*F15B 1/26* (2006.01)
*F16K 17/26* (2006.01)
(Continued)

(52) U.S. Cl.
CPC ............ *F15B 1/265* (2013.01); *B60K 17/043* (2013.01); *B60K 17/105* (2013.01); *B60K 17/14* (2013.01);
(Continued)

(58) Field of Classification Search
CPC ......... Y10T 137/7841; Y10T 137/7772; Y10T 137/86324; Y10T 137/86308;
(Continued)

(56) References Cited

U.S. PATENT DOCUMENTS 3,941,149 A * 3/1976 Mittleman ............ A61M 39/24
137/493.1
4,979,583 A 12/1990 Thoma et al.
(Continued)

FOREIGN PATENT DOCUMENTS

EP 3219242 9/2017

OTHER PUBLICATIONS

U.S. Appl. No. 15/347,136, filed Nov. 9, 2016.
U.S. Appl. No. 15/846,660, filed Dec. 19, 2017.

*Primary Examiner* — Atif H Chaudry
(74) *Attorney, Agent, or Firm* — Neal, Gerber & Eisenberg LLP

(57) ABSTRACT

An expansion tank includes a tank body mounted inside a housing forming a sump, where the tank body defines an internal expansion volume. A fluid inlet tube on the tank body has an upper end open to the sump and a lower end open to the internal expansion volume. A single 2-way check valve is located at the lower end of the tube, and fluid enters the expansion volume when the pressure in the sump exceeds the pressure in the expansion volume by a first predetermined amount, and fluid exits the expansion volume to the sump when the pressure in the expansion volume exceeds the pressure in the sump by a second predetermined amount. The check valve may be a combination duckbill valve and umbrella valve. The tank body may include a cover on which the inlet tube is formed.

20 Claims, 26 Drawing Sheets

(51) Int. Cl.
*F16K 17/19* (2006.01)
*F16K 17/18* (2006.01)
*F16H 39/14* (2006.01)
*F16D 55/40* (2006.01)
*F16H 61/4096* (2010.01)
*B60K 17/356* (2006.01)
*B60K 17/10* (2006.01)
*B60K 17/04* (2006.01)
*B60K 17/344* (2006.01)
*B60K 17/342* (2006.01)
*B60K 17/14* (2006.01)
*F16D 121/16* (2012.01)

(52) U.S. Cl.
CPC .......... *B60K 17/342* (2013.01); *B60K 17/344* (2013.01); *B60K 17/356* (2013.01); *F16D 55/40* (2013.01); *F16H 39/14* (2013.01); *F16H 61/4096* (2013.01); *F16K 17/18* (2013.01); *F16K 17/19* (2013.01); *F16K 17/26* (2013.01); *F16D 2121/16* (2013.01); *Y10T 137/7772* (2015.04); *Y10T 137/7779* (2015.04); *Y10T 137/7841* (2015.04); *Y10T 137/86308* (2015.04); *Y10T 137/86324* (2015.04)

(58) Field of Classification Search
CPC ... Y10T 137/7779; F16K 17/19; F16K 17/18; F16K 17/26; F16H 39/14; F16H 61/4096; F16D 55/40; F16D 2121/16; F15B 1/265; B60K 17/342; B60K 17/105; B60K 17/356; B60K 17/043; B60K 17/344; B60K 17/14

See application file for complete search history.

(56) References Cited

U.S. PATENT DOCUMENTS

| | | |
|---|---|---|
| 4,987,796 A | 1/1991 | von Kaler et al. |
| 5,259,194 A | 11/1993 | Okada |
| 5,314,387 A | 5/1994 | Hauser et al. |
| 5,555,727 A | 9/1996 | Hauser et al. |
| 5,616,092 A | 4/1997 | Hauser et al. |
| 5,622,051 A | 4/1997 | Iida et al. |
| 6,073,443 A | 6/2000 | Okada et al. |
| 6,185,936 B1 | 2/2001 | Hauser et al. |
| 6,233,929 B1 | 5/2001 | Okada et al. |
| 6,341,489 B1 | 1/2002 | Iida |
| 6,354,975 B1 | 3/2002 | Thoma |
| 6,401,869 B1 | 6/2002 | Iida et al. |
| 6,622,825 B2 | 9/2003 | Lida et al. |
| 6,626,065 B2 * | 9/2003 | Arnold ................ B60K 17/105 475/72 |
| 6,662,825 B2 | 12/2003 | Frank et al. |
| 6,745,565 B1 | 6/2004 | Wahner et al. |
| 6,843,747 B1 * | 1/2005 | Phanco ............... F16H 57/0447 475/161 |
| 6,986,406 B1 | 1/2006 | Hauser et al. |
| 7,047,736 B1 | 5/2006 | Langenfeld et al. |
| 7,052,429 B1 | 5/2006 | Phanco et al. |
| 7,210,294 B1 | 5/2007 | Langenfeld et al. |
| 7,845,361 B1 | 12/2010 | Verespej et al. |
| 7,926,266 B1 | 4/2011 | Wigness et al. |
| 7,926,624 B1 | 4/2011 | Taylor |
| 8,028,520 B1 | 10/2011 | Rawski |
| 8,418,452 B1 | 4/2013 | Phanco et al. |
| 8,464,610 B1 | 6/2013 | Langenfeld et al. |
| 8,931,268 B1 | 1/2015 | Langenfeld |
| 9,856,969 B1 | 1/2018 | Niemerg |
| 2002/0115521 A1 * | 8/2002 | Thoma ................ B60K 17/105 475/221 |

* cited by examiner

FLUID EXPANSION TANK

CROSS-REFERENCE

This application claims the benefit of U.S. Provisional Application No. 62/436,154 filed on Dec. 19, 2016, which is incorporated by reference herein in its entirety.

BACKGROUND

This application is related to drive devices for a variety of vehicles, including ride-on mowers, stand-on mowers and walk-behind vehicles such as snow throwers. A hydraulic fluid expansion tank is often associated with these drive devices and is often located external to the housings of these drive devices. It is also known to locate the fluid expansion tank inside a housing of the drive device to prevent damage to the expansion tank, conserve space and eliminate components such as external fluid lines and fittings that are also susceptible to damage. Such internal tanks typically use a siphon system. There is a need for an improved internal expansion tank that will increase flexibility for the drive device manufacturer and allow for reduced hydraulic fluid volume, reduced weight and reduced cost. There is also a need for an internal expansion tank that will provide an improved system for removing entrained air from the hydraulic system.

SUMMARY

The present invention provides an improved hydraulic fluid expansion tank located in a fluid sump inside a housing of a drive device, which may be used in a variety of vehicle or other applications. In its most basic configuration, such an internal expansion tank has one simple orifice or opening (in communication with sump) located near the bottom of the expansion tank and a vent opening at the top of the expansion tank in communication with atmosphere. As used herein, the terms "top" and "bottom," or "upper" and "lower," should be read with regard to normal operation of a hydraulic drive device such as the examples disclosed herein. As is known, the moving components in the fluid sump churn air and oil together. This foamy mixture is forced into the expansion tank while the oil-air mixture expands as the temperature of the drive device rises. During drive device operation and subsequent cooling, the air bubbles in the mixture are released into the upper air volume of the expansion tank and out through the vent to atmosphere, and the expansion tank returns oil having a lesser amount of entrained air to the sump through the orifice located near the bottom of the expansion tank.

In each embodiment described herein, the expansion tank body may comprise a main body and a cover. In one embodiment, a simple orifice is located near the bottom of the expansion tank, and an upper check valve is located near the top of the expansion tank. Such an arrangement permits air to enter the expansion tank through the upper check valve during thermal expansion, and fluid would also expand into the expansion tank through the lower orifice. Although functional, this embodiment is not ideal, as it requires multiple temperature cycles to remove the entrained air from the oil.

In another embodiment, a pair of check valves is used, with a first check valve located near the top of the expansion tank and permitting fluid flow only from the fluid sump into the expansion tank, and a second check valve located near the bottom of the expansion tank and permitting flow only from the tank to the sump. In an embodiment, the two check valves may be umbrella-style check valves. In a further embodiment, the upper check valve may be a duckbill style check valve that can be installed from the exterior of the tank, and the lower valve may be an umbrella-style check valve that can also be installed from the exterior of the tank. Both of these check valve designs are known and commercially available, and other types of one-way or check valves could also be used.

In one configuration, a single duckbill-umbrella combination valve, such as is commercially available from Minivalve International B.V., may be located near the bottom of the expansion tank. The "umbrella" or flexible flange portion of the valve permits fluid flow into the tank during thermal expansion and the duckbill portion of the valve permits fluid flow from the tank to the sump as the fluid cools.

In a further embodiment, a fluid inlet tube (or riser tube) is integrally formed in an expansion tank, the tube having an upper end open to the internal volume or sump of the drive device and an opening at its lower end in communication with the umbrella portion of a duckbill-umbrella combination valve. The riser tube in this embodiment may be formed in the cover. This configuration requires a slightly more complex expansion tank structure, but helps reduce air entrainment by allowing the oil-air mixture from the upper portion of the drive device interior to enter the expansion tank through the fluid inlet tube and eventually exit through a vent at the top of the expansion tank in communication with atmosphere. As the drive device cools, the fluid from the expansion tank, now having less entrained air, flows directly back into sump through the duckbill portion of the duckbill-umbrella combination valve.

In a further embodiment, the integrally formed riser tube serves as both the inlet passage to the expansion tank and the outlet passage from the expansion tank. A duckbill-umbrella combination valve is positioned at the lower end of the riser tube to enable this 2-way flow. The umbrella portion of the valve allows fluid to flow into the tank during thermal expansion and the duckbill portion of the valve permits fluid to flow out of the tank and back through the riser tube to sump as the fluid cools. Entrained air in the fluid entering the expansion tank eventually escapes to atmosphere through a vent at the top of the expansion tank.

In a further embodiment, an expansion tank is used in connection with a drive device having a housing forming an internal sump containing hydraulic fluid, a transmission comprising a center section disposed in the internal sump and a reduction gear train comprising a final output gear, the final output gear mounted on an axle disposed in the internal sump and driven by the transmission. The expansion tank may be capable of receiving hydraulic fluid from the internal sump and discharging hydraulic fluid to the internal sump and may be disposed adjacent to the final output gear and separate from the housing, wherein the expansion tank is at least partially retained in position by contact with the center section.

A better understanding of the properties of the invention will be obtained from the following detailed description and accompanying drawings which set forth one or more illustrative embodiments and are indicative of the various ways in which the invention may be employed.

DETAILED DESCRIPTION OF THE DRAWINGS

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

Figure 1:
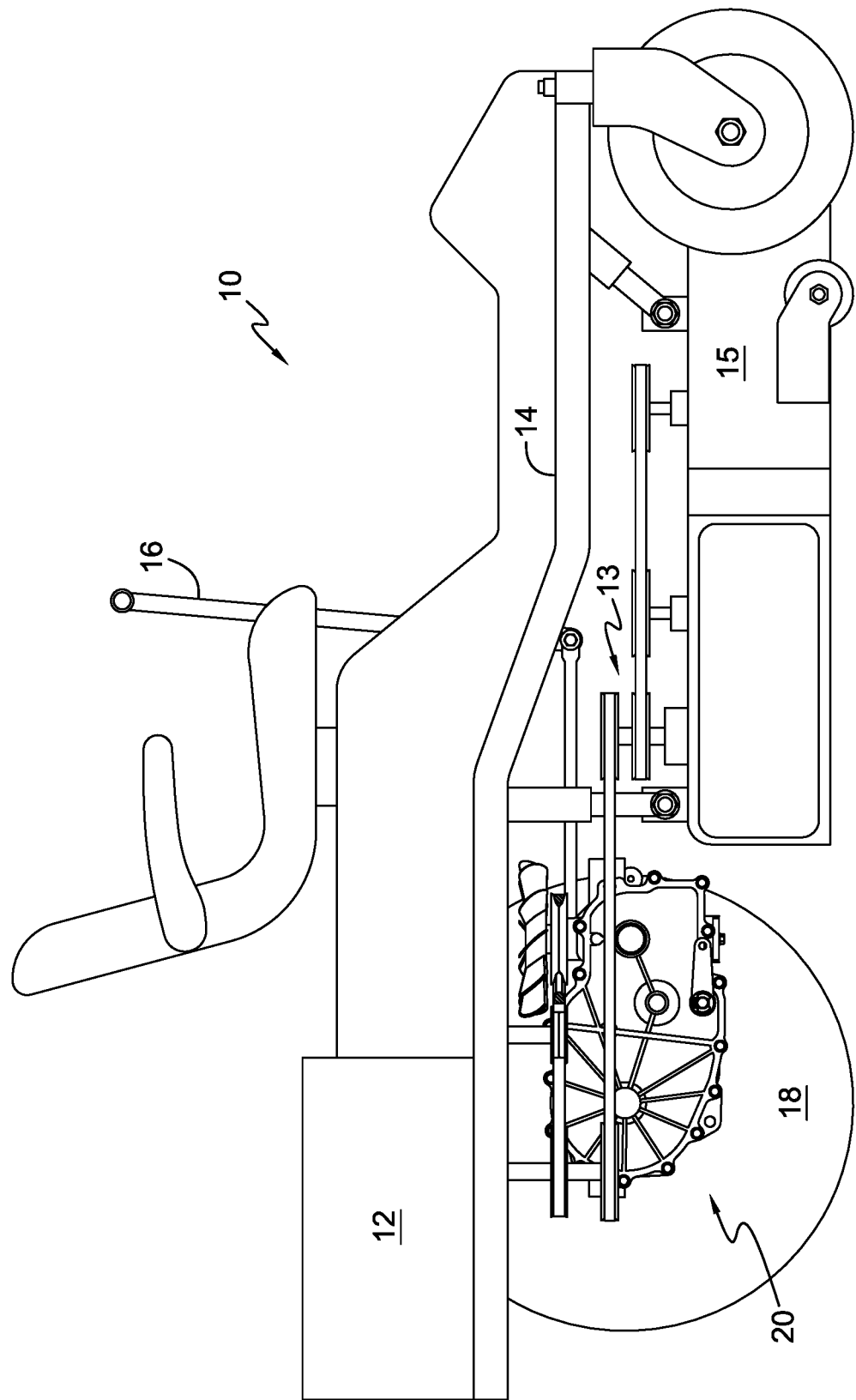
FIG. 1 is a side elevational view of an exemplary vehicle for use with an expansion tank in accordance with the teachings herein, with one driven wheel and one transaxle removed for clarity.

For convenience of understanding the disclosure herein, an exemplary vehicle 10 is shown in FIG. 1. It will be understood that other vehicles and applications can be used in accordance with the present invention. In general, exemplary vehicle 10 includes a prime mover or engine 12 powering a pair of hydraulic drive devices, here depicted as transaxles 20, mounted on frame 14, each separately driving a wheel 18. Such vehicles generally include an engine-driven apparatus such as mower deck 15, which may be connected to engine 12 through a belt and pulley assembly 13. In the exemplary vehicle configuration, two user controls 16 are mounted in vehicle 10 and connected to respective transaxles 20 to independently control the output speed and direction of each transaxle 20 to enable zero turn radius capability of vehicle 10. Only one of the driven wheels 18, transaxles 20 and user controls 16 is depicted in FIG. 1 for clarity. It will be understood that there will be additional linkages and the like that are not depicted herein for the sake of simplicity, such as engine controls and brake linkages. Additionally, methods of controlling transaxles 20 other than that depicted are known and may be used in connection with the invention disclosed herein.

The exemplary transaxle 20 is shown in more detail in FIGS. 2-6. A main housing 21 is joined by a plurality of fasteners 23 and joint sealant (not shown) or by other known means to a side housing 22 along a split line generally perpendicular to output axle 24 to form a case comprising a hydraulic fluid sump 25. It will be understood that for proper operation of the devices as disclosed herein, the drive device such as transaxle 20 should be properly sealed to prevent the introduction of air into the fluid sump 25.

In a typical zero turn vehicle arrangement, two such transaxles 20 are used, as previously mentioned herein, and each may be a mirror image of the other. Hydrostatic transaxles are well-known in the art, and the internal functioning of the various components, such as the pump, motor, hydraulic porting and the like are described, for example, in U.S. Pat. Nos. 5,314,387; 6,185,936; 7,926,624; and 7,926,266, all of which are commonly owned with this application and all of which are incorporated herein by reference.

Figure 4:
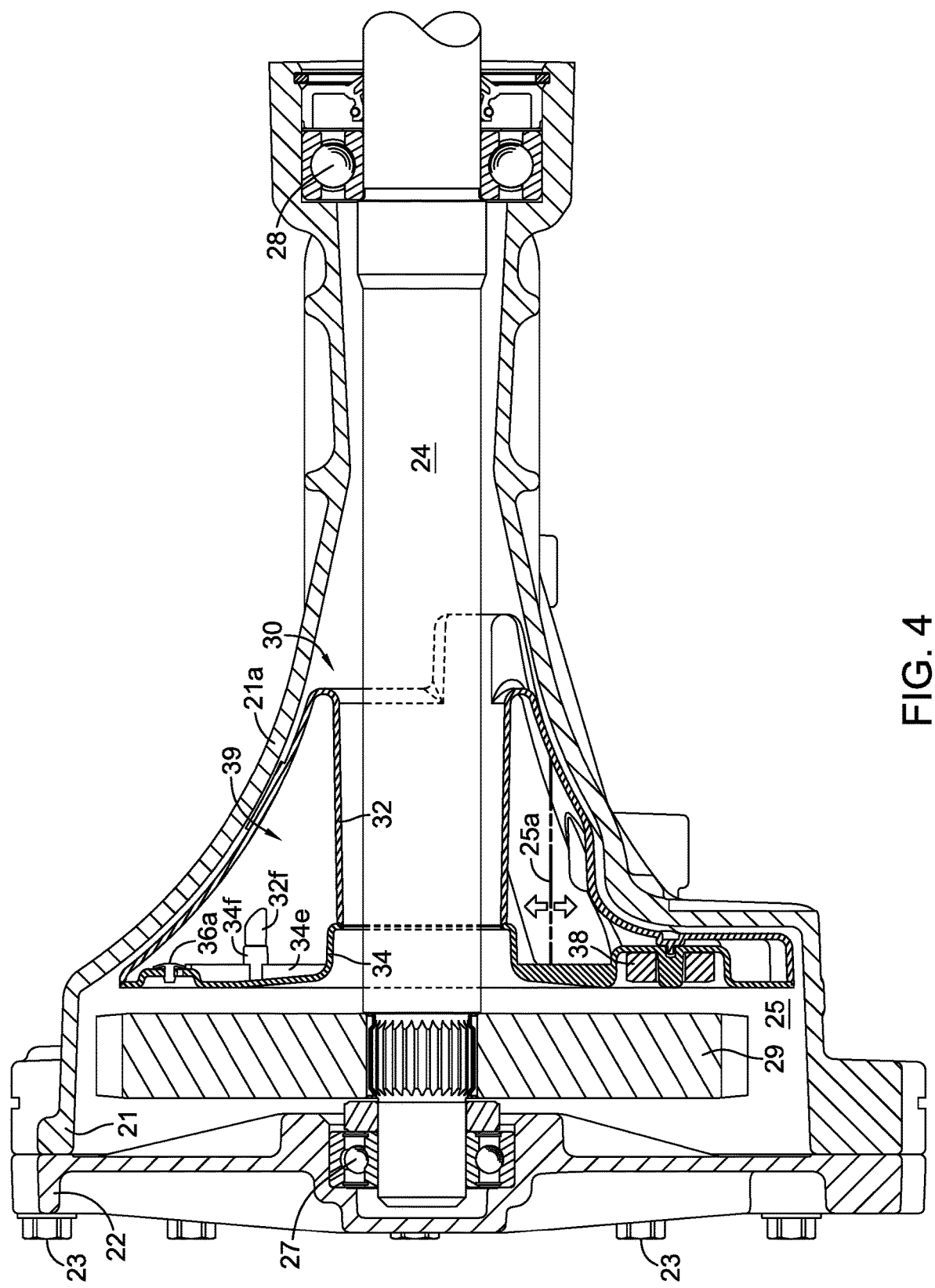
FIG. 4 is a cross-sectional view of the transaxle of FIG. 2, along the line 4-4 in FIG. 3, depicting a first embodiment of an internal expansion tank in accordance with the teachings herein.
Figure 6:
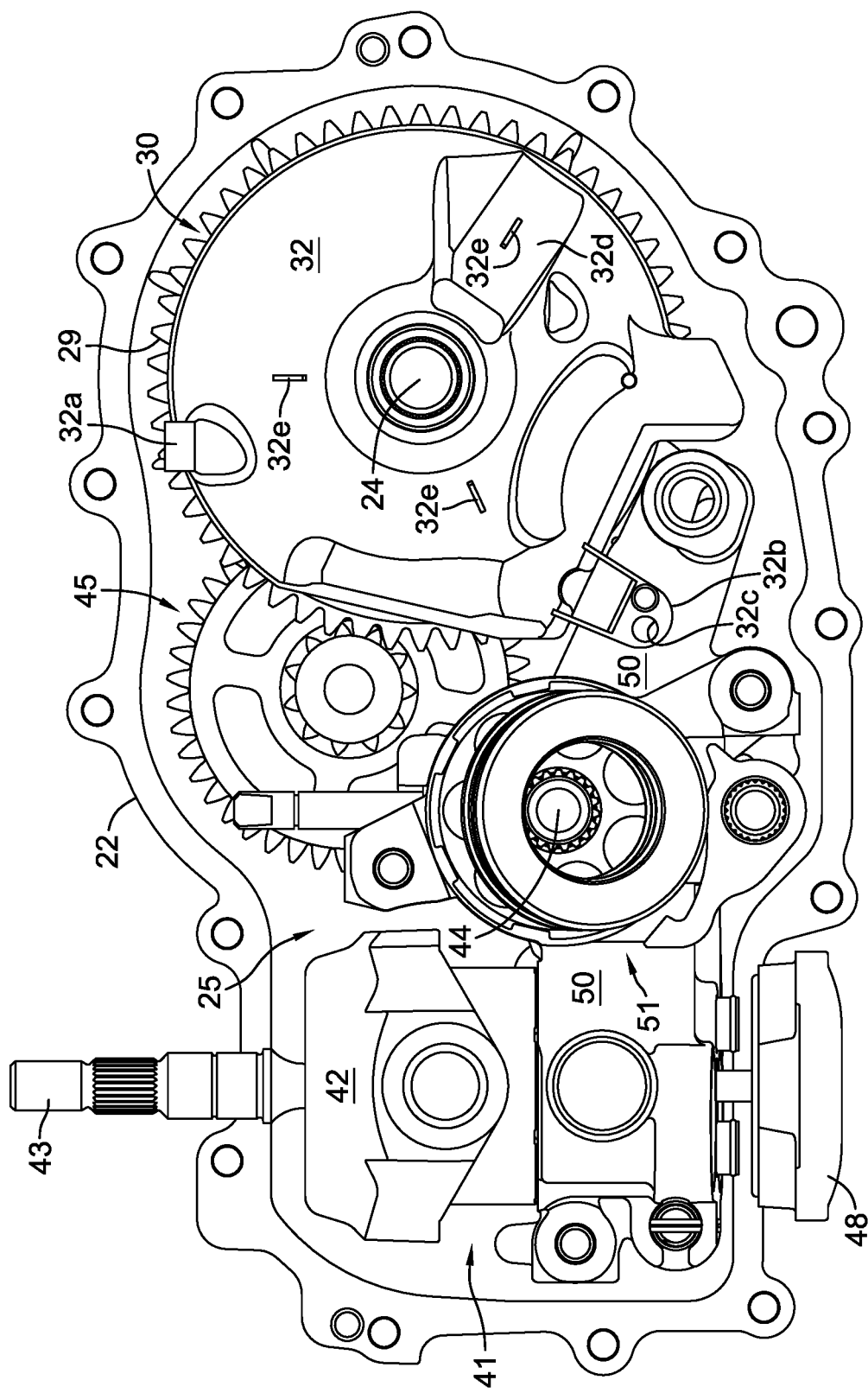
FIG. 6 is an elevational view of the opposite side of the internal expansion tank shown in FIG. 5, along with hydrostatic and gearing components of a transaxle such as that shown in FIG. 2.
Figure 7:
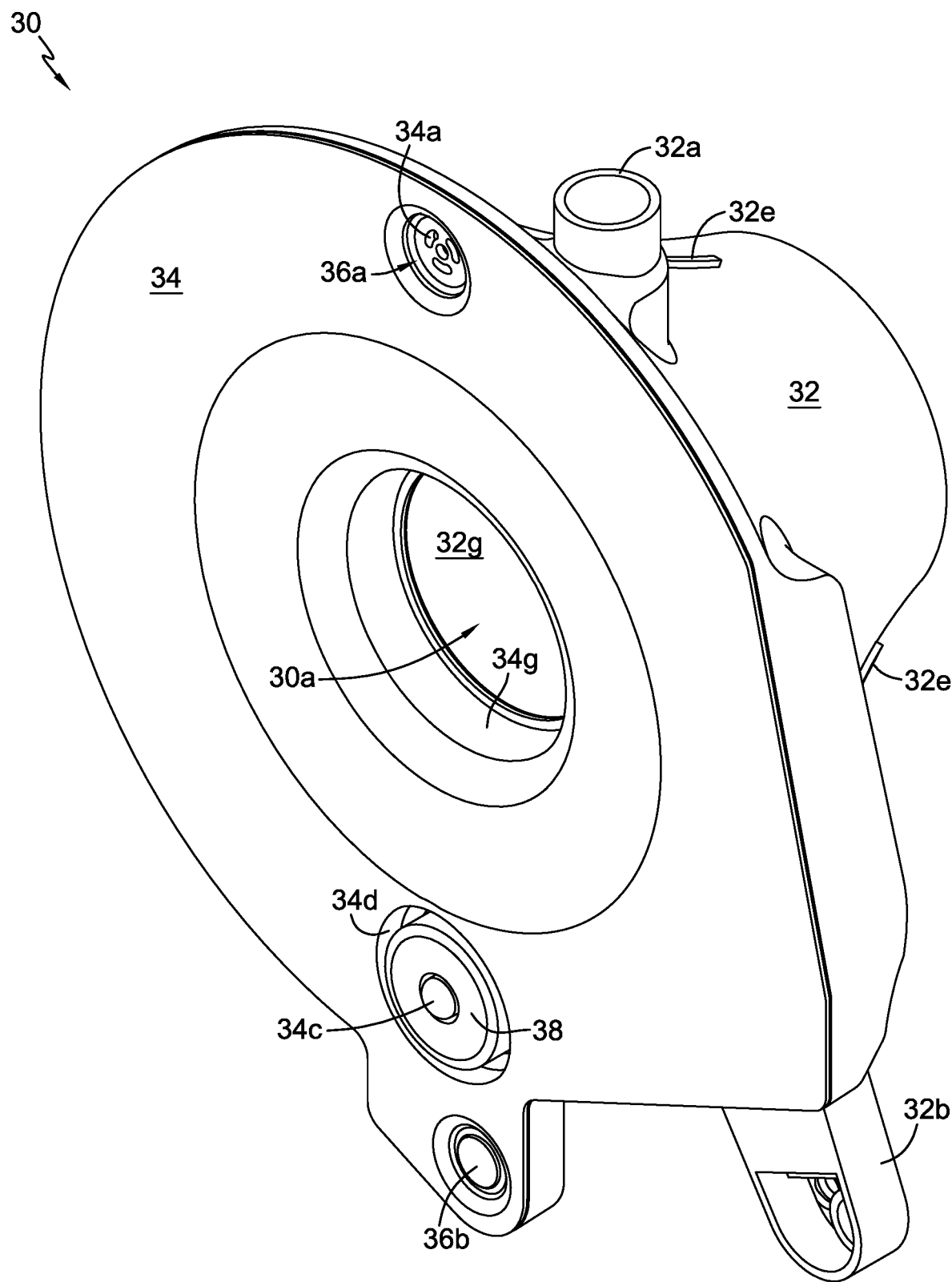
FIG. 7 is a perspective view of the internal expansion tank of FIG. 4.
Figure 8:
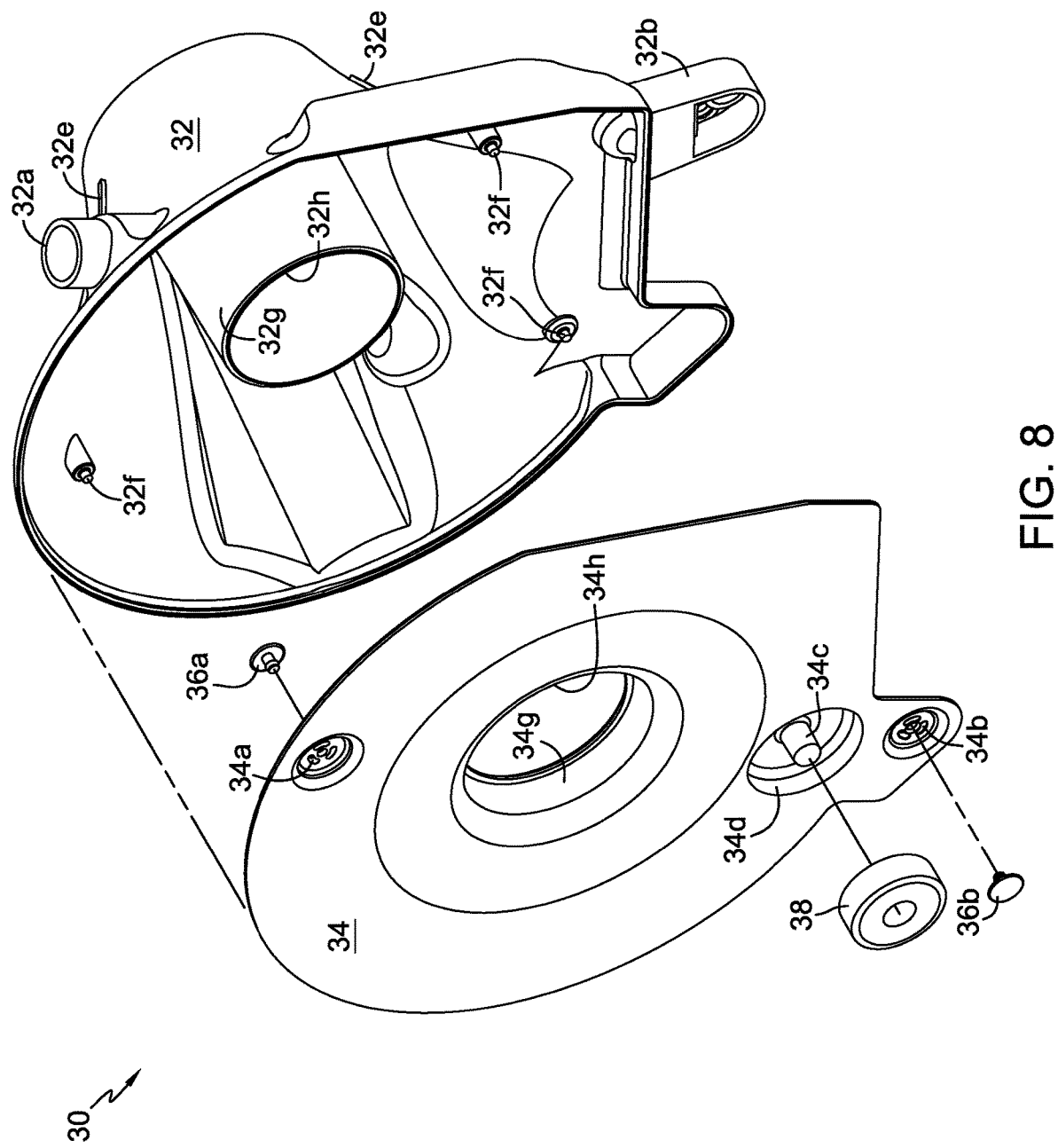
FIG. 8 is an exploded perspective view of the internal expansion tank of FIG. 7.
Figure 9:
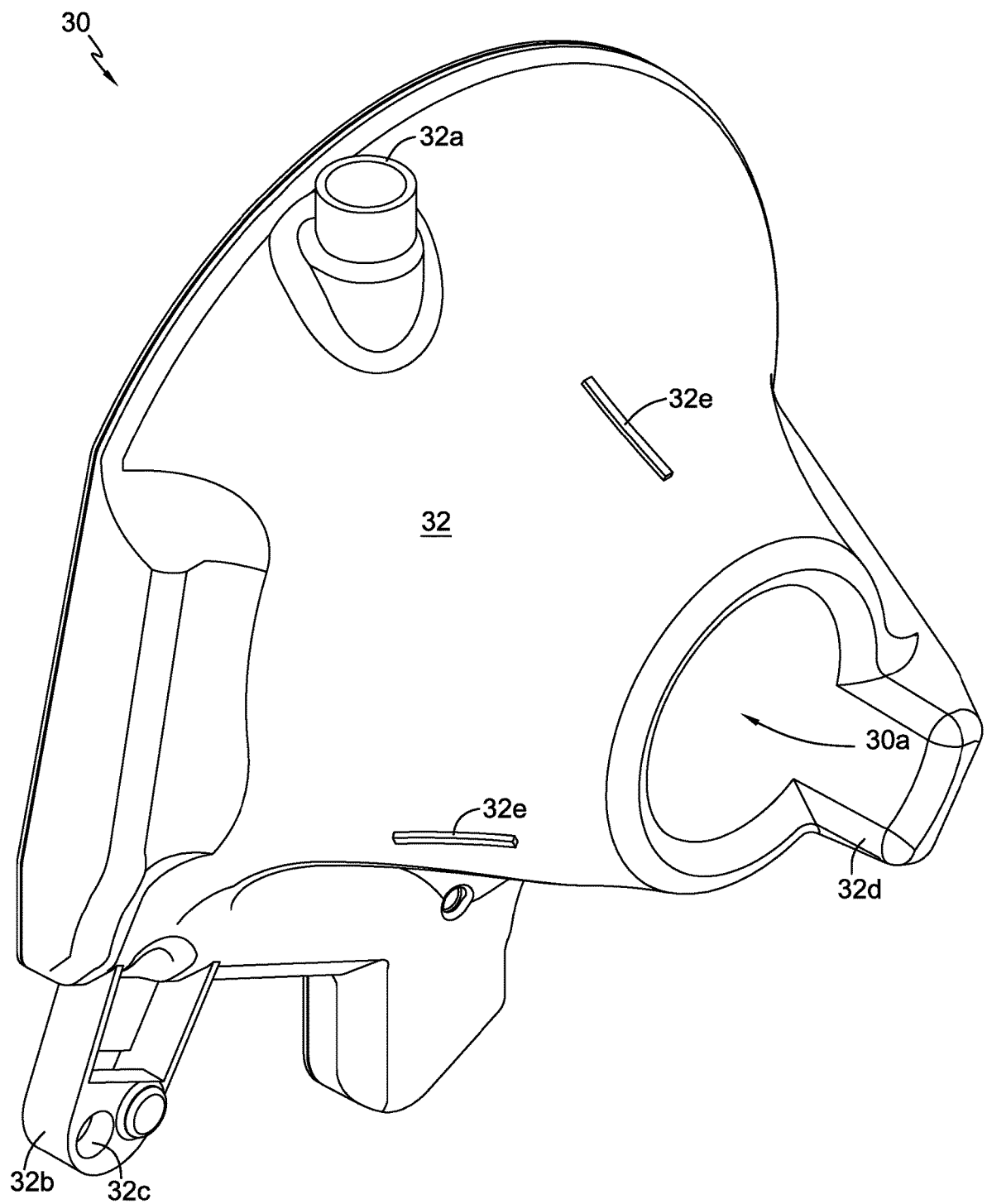
FIG. 9 is a perspective view of the internal expansion tank of FIG. 7, rotated 90 degrees about a vertical axis.
Figure 10:
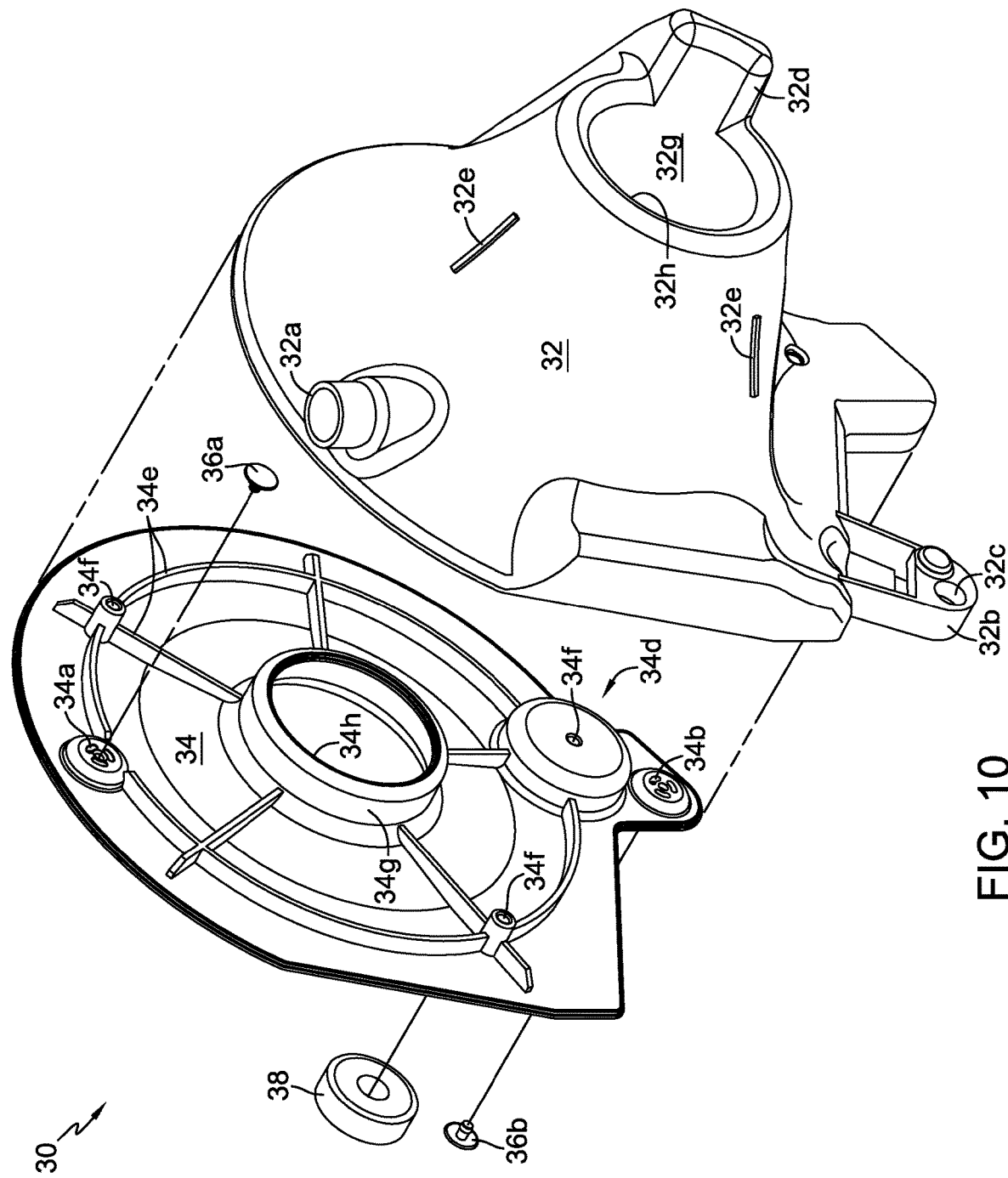
FIG. 10 is an exploded perspective view of the internal expansion tank of FIG. 9.

Certain internal components of transaxle 20 are depicted in FIG. 6, including a hydraulic pump 41 rotatably disposed on a center section 50 in sump 25 and controlled by a swash plate 42. Pump input shaft 43 drives hydraulic pump 41 and may also drive an optional charge pump 48. Hydraulic motor 51 is also rotatably disposed on center section 50 in sump 25 and drives a motor output shaft 44, which is engaged to a reduction gear train 45 comprising a final output gear 29. As shown in FIGS. 4 and 6, the final output gear 29 can be positioned between side housing 22 and internal expansion tank 30. Final output gear 29 is drivingly engaged to and supported on the output axle 24 which is rotationally supported by a proximal bearing 27 and a distal bearing 28. Except as described herein, the internal structure and operation of transaxle 20 can be substantially identical to that shown and described in the aforementioned U.S. Pat. Nos. 7,926,266 and 7,926,624 and the reader is referred to those patents for additional details on the structure and operation of such hydraulic components. Alternatively, in a typical integrated hydrostatic transaxle (IHT) arrangement, such as that shown in U.S. Pat. Nos. 5,314,387 and 6,185,936, a single transaxle unit includes two axles and housing structure surrounding and supporting the two axles in a manner that also allows application of the present invention to that type of transaxle unit. Furthermore, the invention may be applied in conjunction with the axle support structure associated with just one or with both of the two axles in a typical IHT arrangement, as needed.

The particular shape of the housing is not critical, but transaxle housings generally have an axle horn such as axle horn 21a or a separate area within the main housing to accommodate the axle. Configuring the internal expansion tank such that at least a portion of it encompasses the axle allows for a more compact unit. In the embodiment depicted, axle horn 21a is integrally formed as part of the main housing but separate axle horns that are attached to a main housing are known. The size and shape of axle horn 21a can be varied depending on application requirements.

Figure 5:
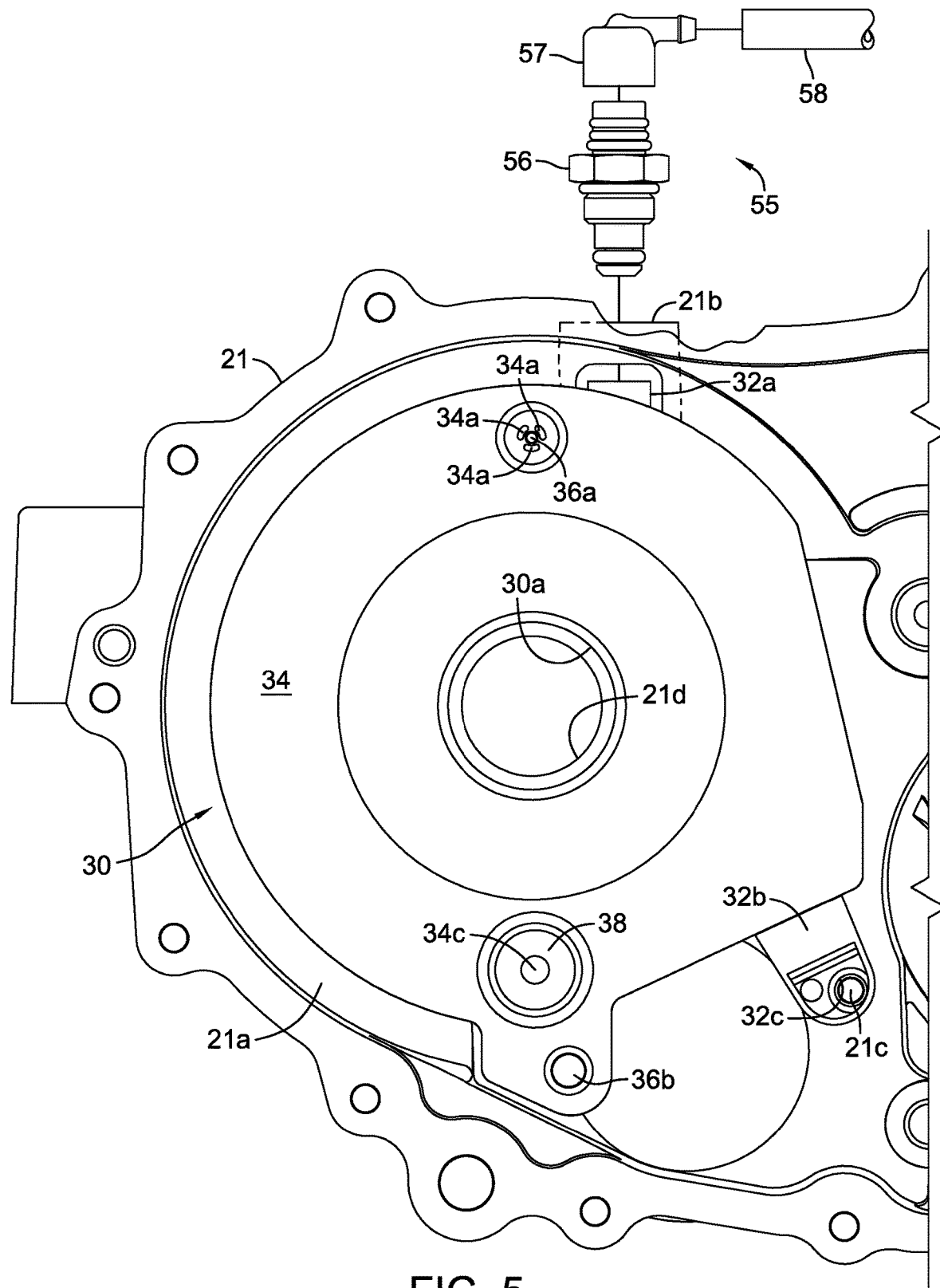
FIG. 5 is an elevational view of the internal expansion tank of FIG. 4 mounted in a housing member of a transaxle such as that shown in FIG. 2, and including an exploded view of a vent assembly for use with the expansion tank.

As shown in FIG. 5, a vent assembly 55 comprising a vent fitting 56, a vent cap 57 and a vent tube 58 can be used to connect the internal expansion tank to atmosphere and restrict entry of contaminants into expansion tank 30. The vent fitting 56 depicted is an SAE-style fitting adapted for insertion into a vent stem 32a formed on main body 32 of expansion tank 30, the vent stem 32a comprising an opening to an internal volume 39 of expansion tank 30. Vent fitting 56 is seated and sealed in vent stem 32a when installed in vent port 21b of main housing 21. Other vent assemblies may be used in lieu of the depicted vent assembly 55 to provide similar functionality.

A first expansion tank 30 is illustrated in FIGS. 4-10. Expansion tank 30 is an assembly comprising a main body 32, a cover 34, an upper check valve 36a, a lower check valve 36b, and an optional magnet 38. Main body 32 and cover 34 form a tank body and are preferably composed of a weldable synthetic polymer (plastic) that can withstand the internal operating environment of drive device or transaxle 20, and expansion tank 30 is capable of receiving the hydraulic fluid from, and discharging hydraulic fluid to, internal sump 25. To enable this one-way fluid circuit, cover 34 includes at least one upper fluid flow opening 34a to accommodate fluid flow into expansion tank 30, and at least one lower fluid flow opening 34b to accommodate fluid flow out of expansion tank 30. It is preferred that the fluid level 25a in the internal volume 39 of expansion tank 30 remains above the lower check valve 36b as it rises and falls, so that air is not pulled into sump 25.

The upper check valve 36a is installed on the inner surface of cover 34 in conjunction with upper fluid flow opening(s) 34a, and the lower check valve 36b is installed on the outer surface of cover 34 in conjunction with lower fluid flow opening(s) 34b. Simple, low-cost, umbrella-style check valves 36a, 36b are shown, but other check valves providing the same one-way fluid flow function could be used. In an alternative embodiment (not shown), removable parts comprising these fluid flow openings or passages 34a, 34b can be preassembled with respective check valves 36a, 36b to form two check valve/fluid passage subassemblies that can be sealingly snap-fit or otherwise removably installed into the outer surface of cover 34 to enable serviceability of a thus modified expansion tank 30. In addition to snap-fitting these check valve/fluid passage subassemblies into the cover 34, expansion tank 30 can be configured as an entirely snap-fit, non-welded assembly, wherein main body 32 and cover 34 are also sealingly snap-fitted together. Furthermore, the optional magnet 38 can be snap-fit onto post 34c, with the end result being an entirely snap-together expansion tank assembly 30 that does not require bonding or elastomeric seals.

Referring to FIGS. 5 and 6, expansion tank 30 includes an alignment extension 32b that is captured between center section 50 and main housing 21 to help locate and retain the expansion tank 30. Alignment extension 32b includes an alignment opening 32c that engages a protrusion 21c formed on main housing 21 to further ensure proper location of expansion tank 30. In addition to these locating features, main body 32 includes a housing interface form 32d and a plurality of housing contact ribs 32e that also serve to locate and prevent excessive movement of expansion tank 30. Additionally, the contact ribs 32e serve to offset the expansion tank 30 from main housing 21 to allow more thermal transfer from sump 25 to atmosphere. These various features are designed to secure expansion tank 30 such that an axle clearance opening 30a that extends through the assembled expansion tank 30 is approximately aligned concentrically and axially with axle opening 21d formed through the axle horn 21a. Securing expansion tank 30 is necessary to prevent damaging contact of expansion tank 30 with rotating components such as output axle 24 and final output gear 29, and also to prevent impact damage or abrasion against main housing 21 and other internal components such as center section 50. The optional magnet 38 is secured on post 34c in pocket 34d proximate to the lower check valve 36b to trap ferrous particles both inside and outside of expansion tank 30.

The form and details of expansion tank 30 are most clearly seen in FIGS. 7-10. The main body 32 includes a cylindrical or conical structure 32g having an opening 32h formed therethrough to accommodate axle 24. Cover 34 also includes a cylindrical or tube-like conical mating structure 34g that has an opening 34h formed therethrough to accommodate axle 24. The mating inner rims of these two axle clearance openings 32h, 34h, as well as the perimeter mating profiles of main body 32 and cover 34 are welded or otherwise sealingly joined during assembly to form an internal volume 39 that is in communication with sump 25 via check valves 36a, 36b and with atmosphere via the vent assembly 55. Stiffening ribs 34e are provided on cover 34 to improve structural integrity and minimize warping. Additionally, alignment pockets or bosses 34f and mating alignment pins or posts 32f, formed on cover 34 and main body 32, also improve structural integrity and accuracy during the assembly process of expansion tank 30.

Sump 25 contains a volume of hydraulic fluid having some entrained air volume, and may also have an air volume at the top depending upon the fill level in transaxle 20. To improve hydraulic performance (e.g. to ensure pump 41 is immersed in hydraulic fluid) sump 25 will ideally be full (or nearly full) and a lesser, specified volume of hydraulic fluid will also be resident in expansion tank 30 at startup. In general, entrainment of air can affect hydraulic performance and is caused by vigorous hydraulic fluid turbulence created by the moving components inside transaxle 20 during operation when an air volume is present in sump 25. As the hydraulic fluid (including any air volume and entrained air volume) in sump 25 heats up and expands, some of this fluid (including any air volume and entrained air volume) flows through check valve 36a into expansion tank 30, thereby causing the tank fluid level 25a to rise while simultaneously forcing air out of expansion tank 30 through vent assembly 55, including air that was entrained. As transaxle 20 cools during lessened or ceased operations, the hydraulic fluid contracts, thus causing some of the hydraulic fluid volume in expansion tank 30 to return to sump 25 by way of check valve 36b and lowering the tank fluid level 25a. Thus, hydraulic fluid substantially devoid of entrained air is returned to sump 25. While the primary purpose of expansion tank 30 is to accommodate fluid expansion in transaxle 20, other benefits are realized, including the described reduction in the amount of entrained air after multiple heating/cooling cycles, and the use of a smaller volume of hydraulic fluid in transaxle 20, creating an operational cost savings. Flow of hydraulic fluid between sump 25 and expansion tank 30 ceases when transaxle 20 returns to ambient temperature or when a steady state operational temperature is achieved.

Figure 11:
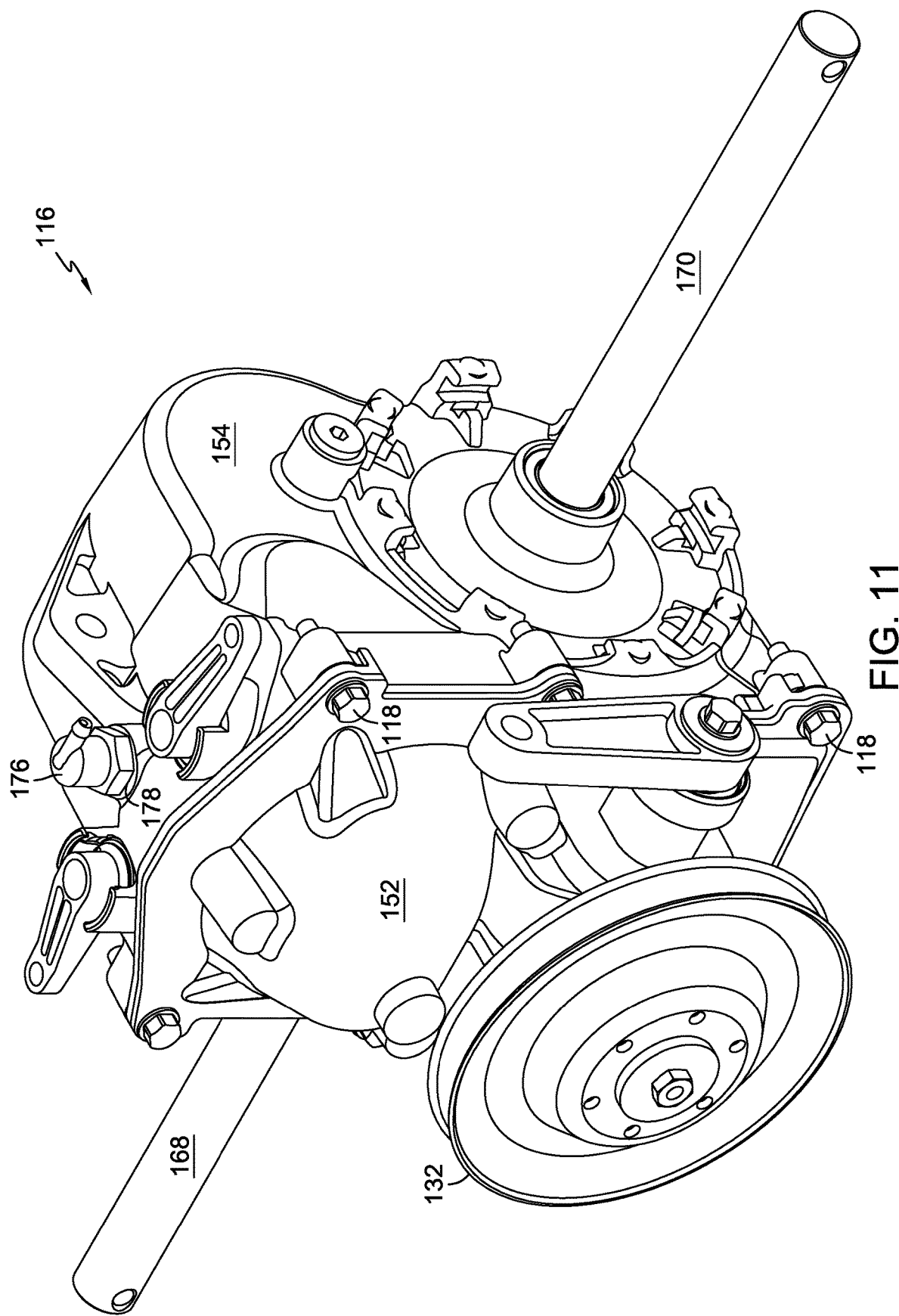
FIG. 11 is a perspective view of another exemplary hydraulic drive device for use with an expansion tank in accordance with the teachings herein.
Figure 12:
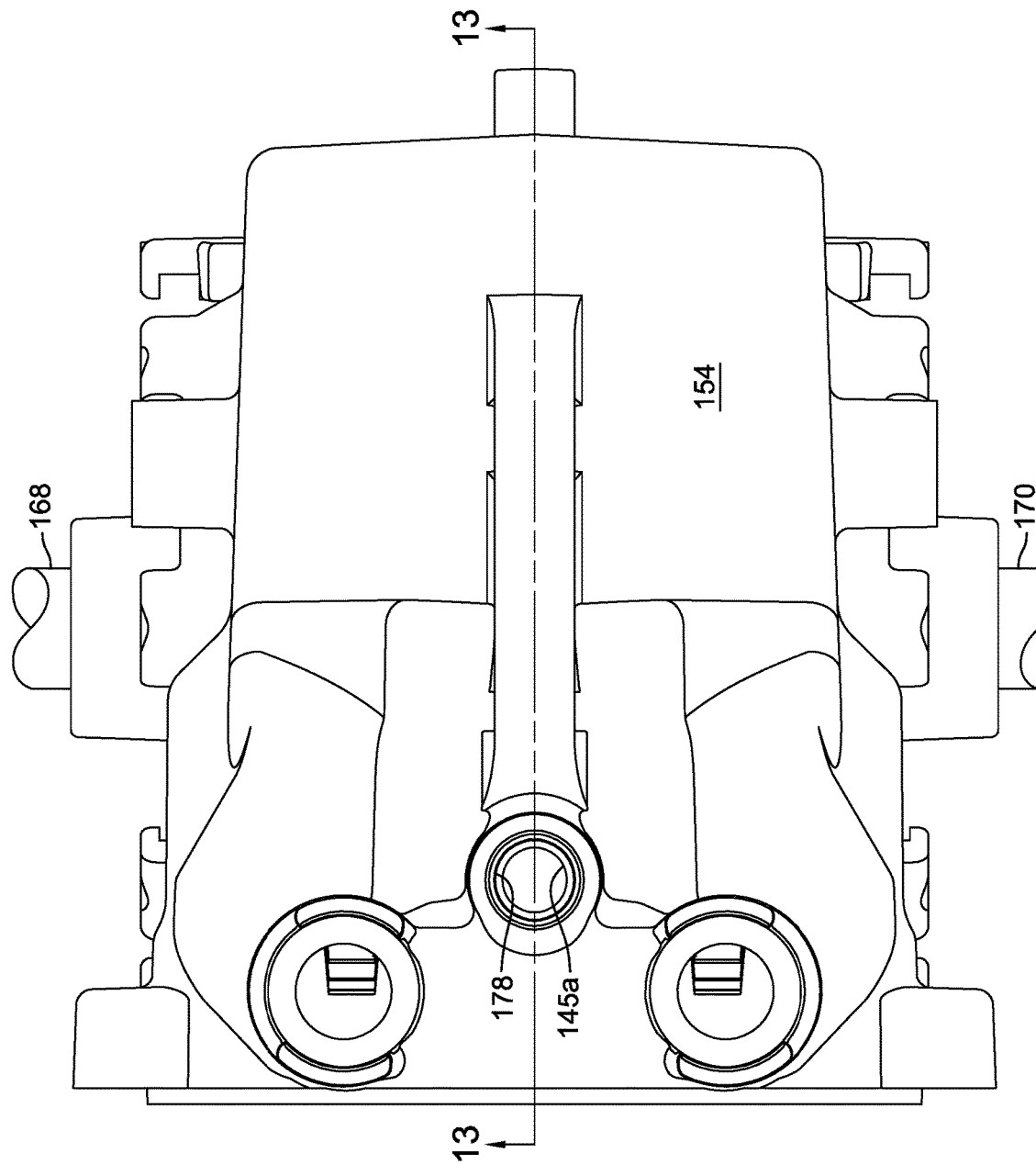
FIG. 12 is a top plan view of a housing of the hydraulic drive device of FIG. 11.
Figure 13:
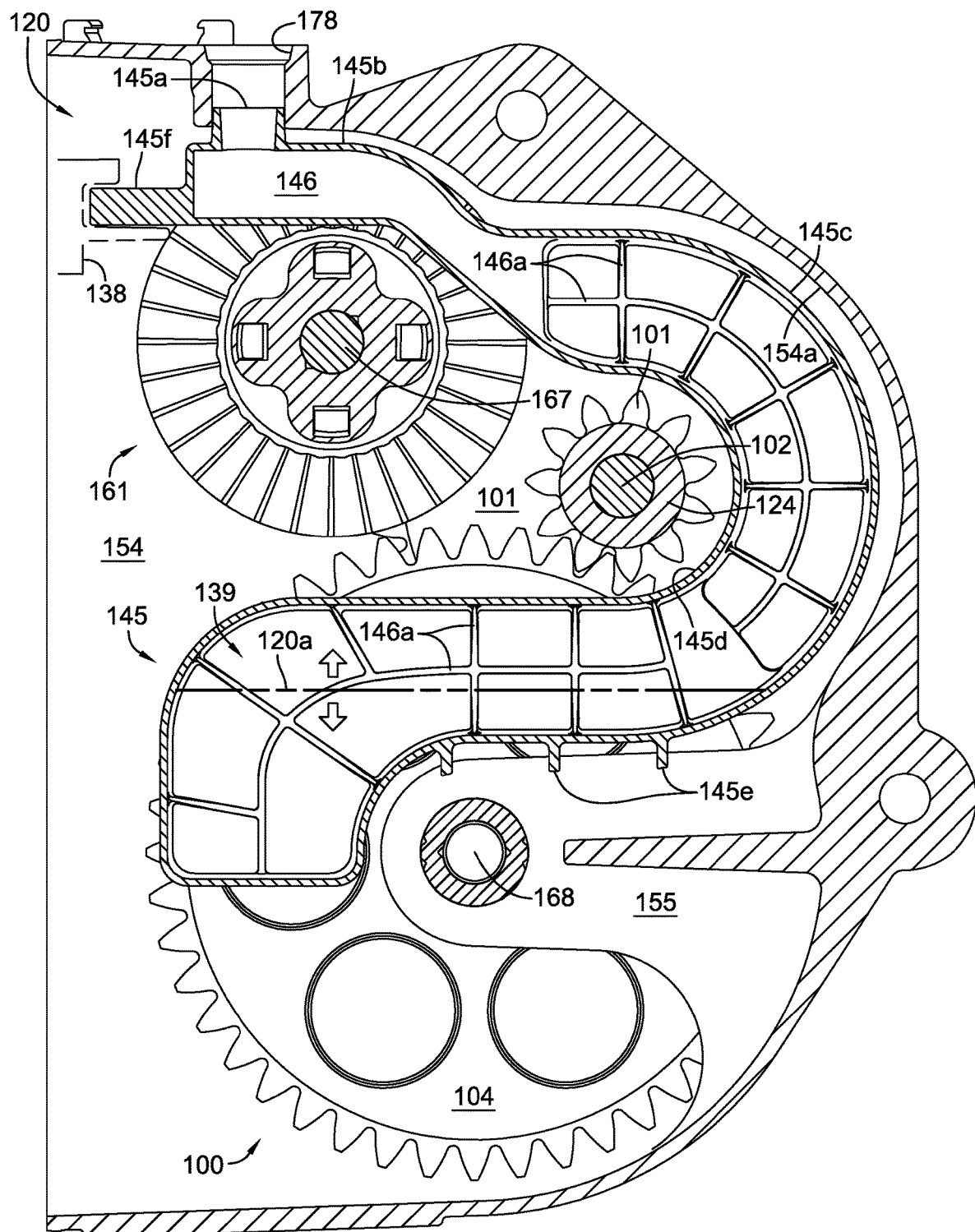
FIG. 13 is a cross-sectional view of a portion of the drive device of FIG. 11, along the line 13-13 in FIG. 12, depicting a second embodiment of an internal expansion tank in accordance with the teachings herein.
Figure 14:
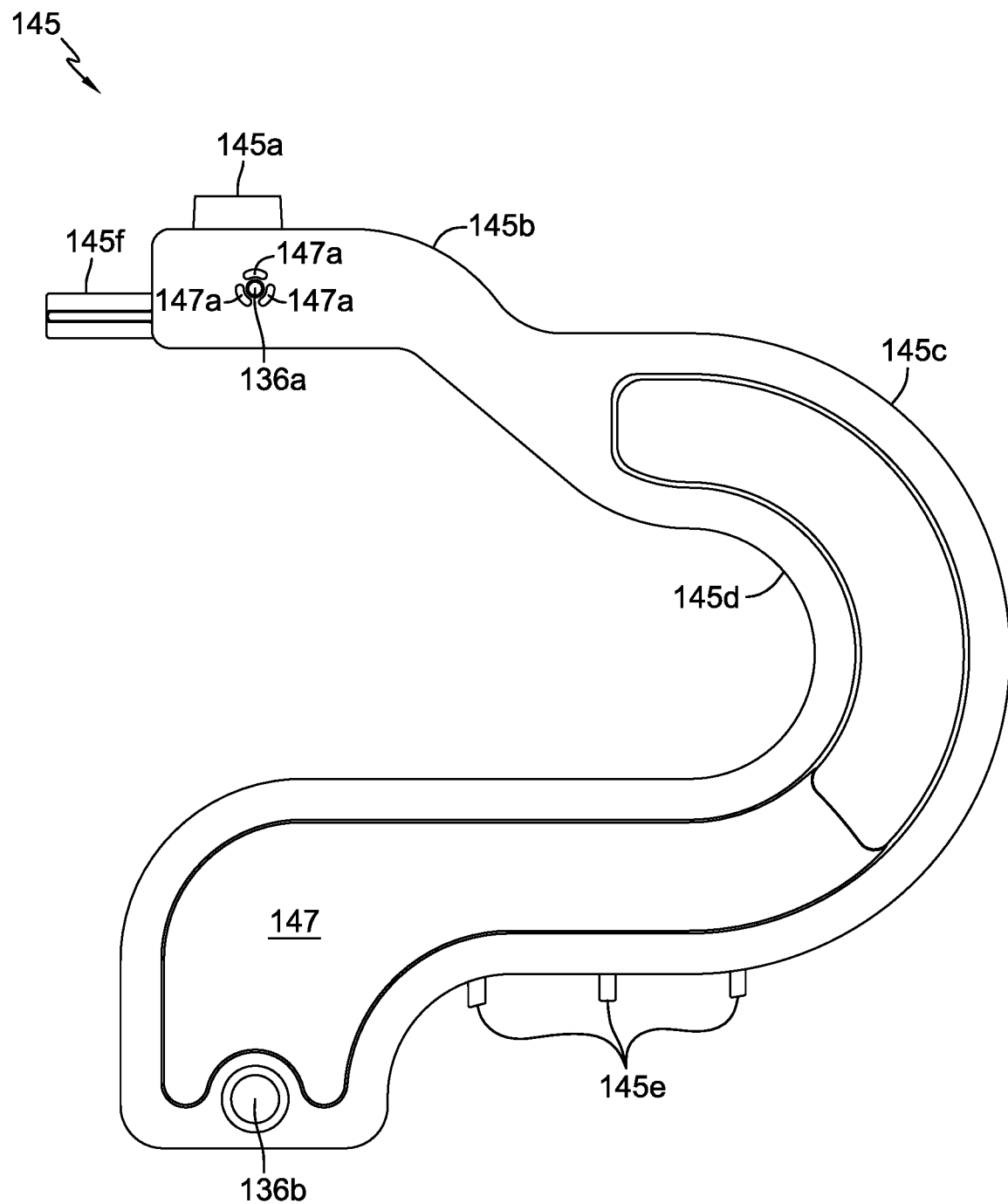
FIG. 14 is an elevational view of the internal expansion tank shown in FIG. 13.
Figure 15:
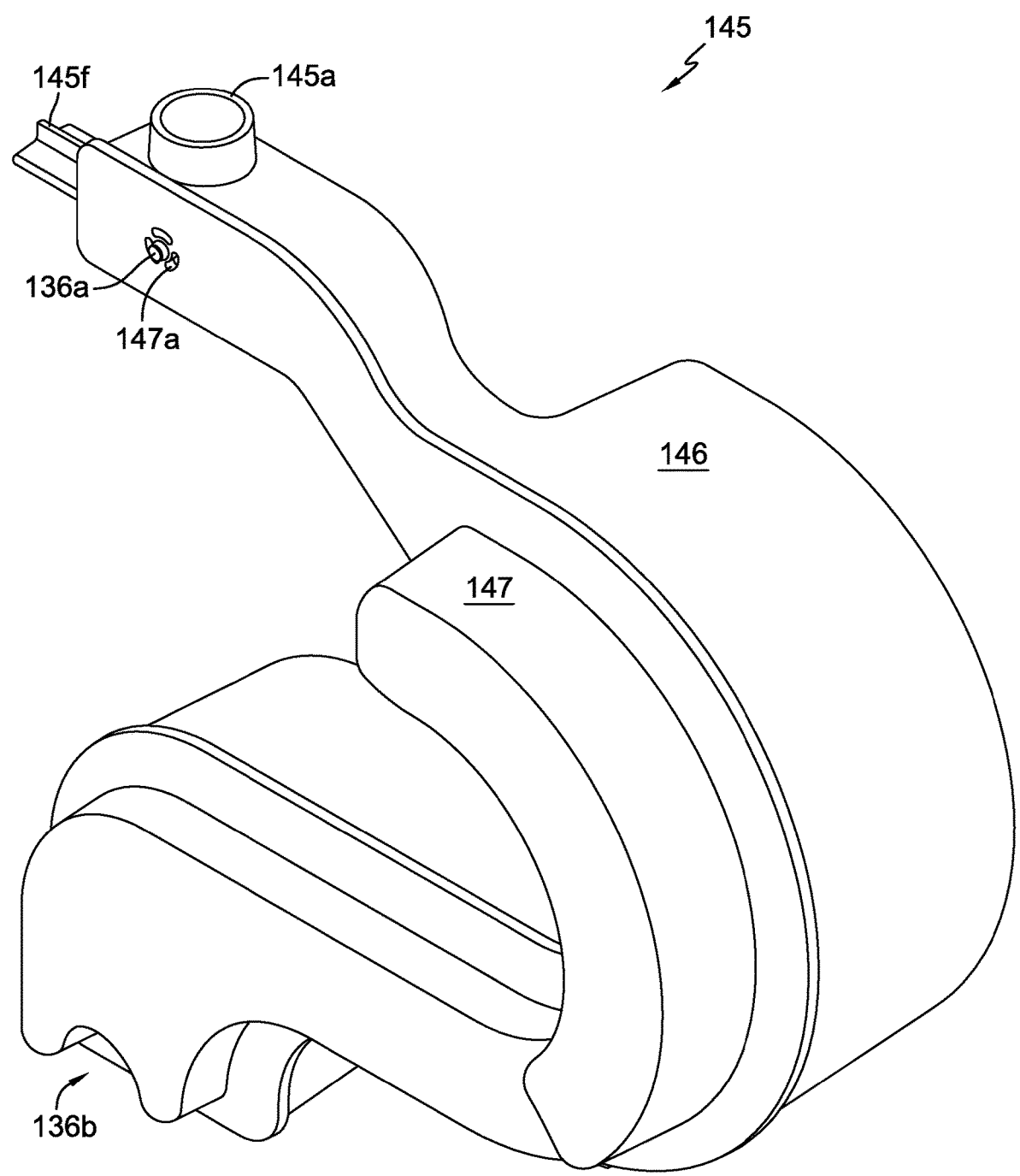
FIG. 15 is a perspective view of the internal expansion tank of FIG. 14.
Figure 16:
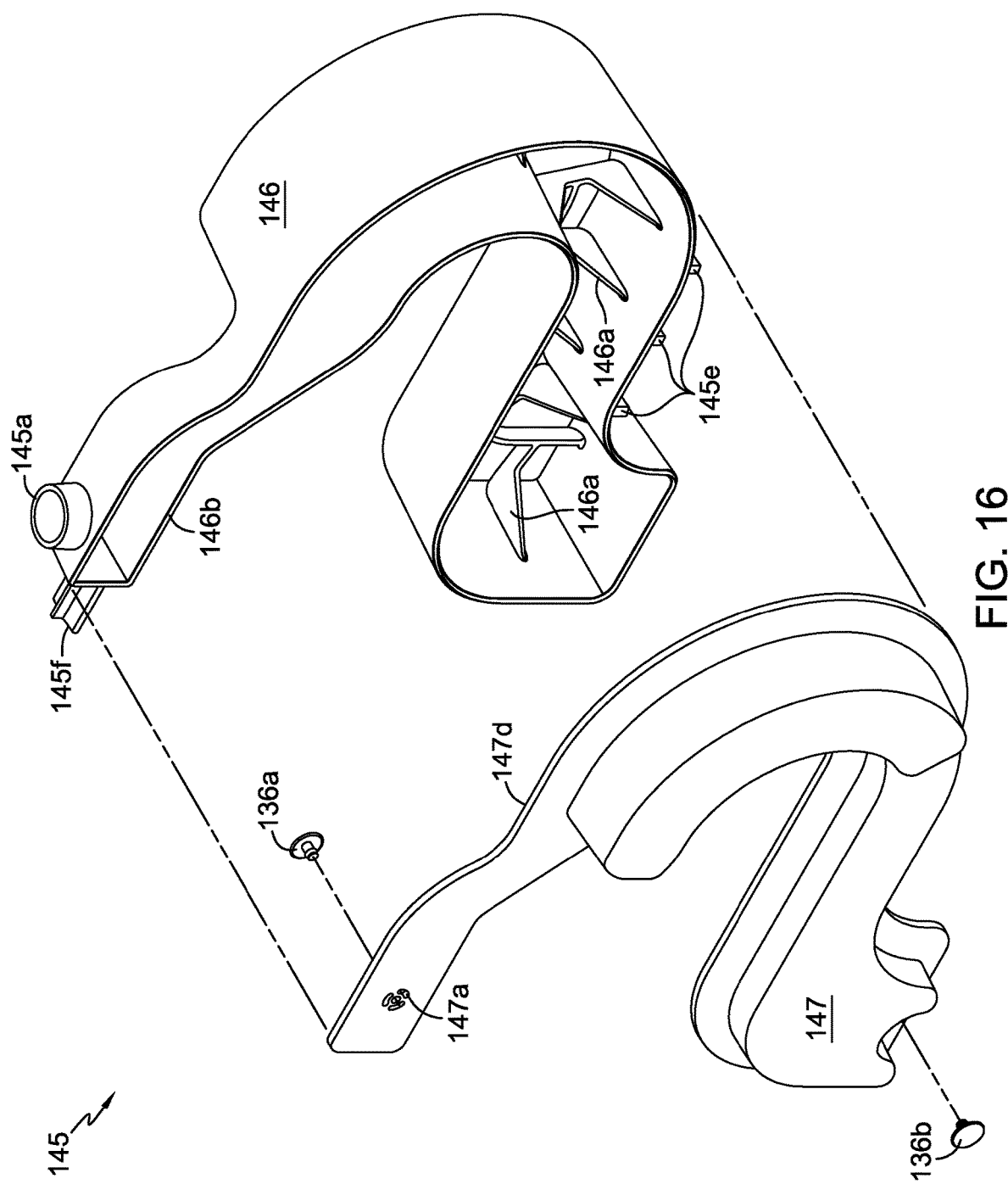
FIG. 16 is an exploded perspective view of the internal expansion tank of FIG. 15.
Figure 17:
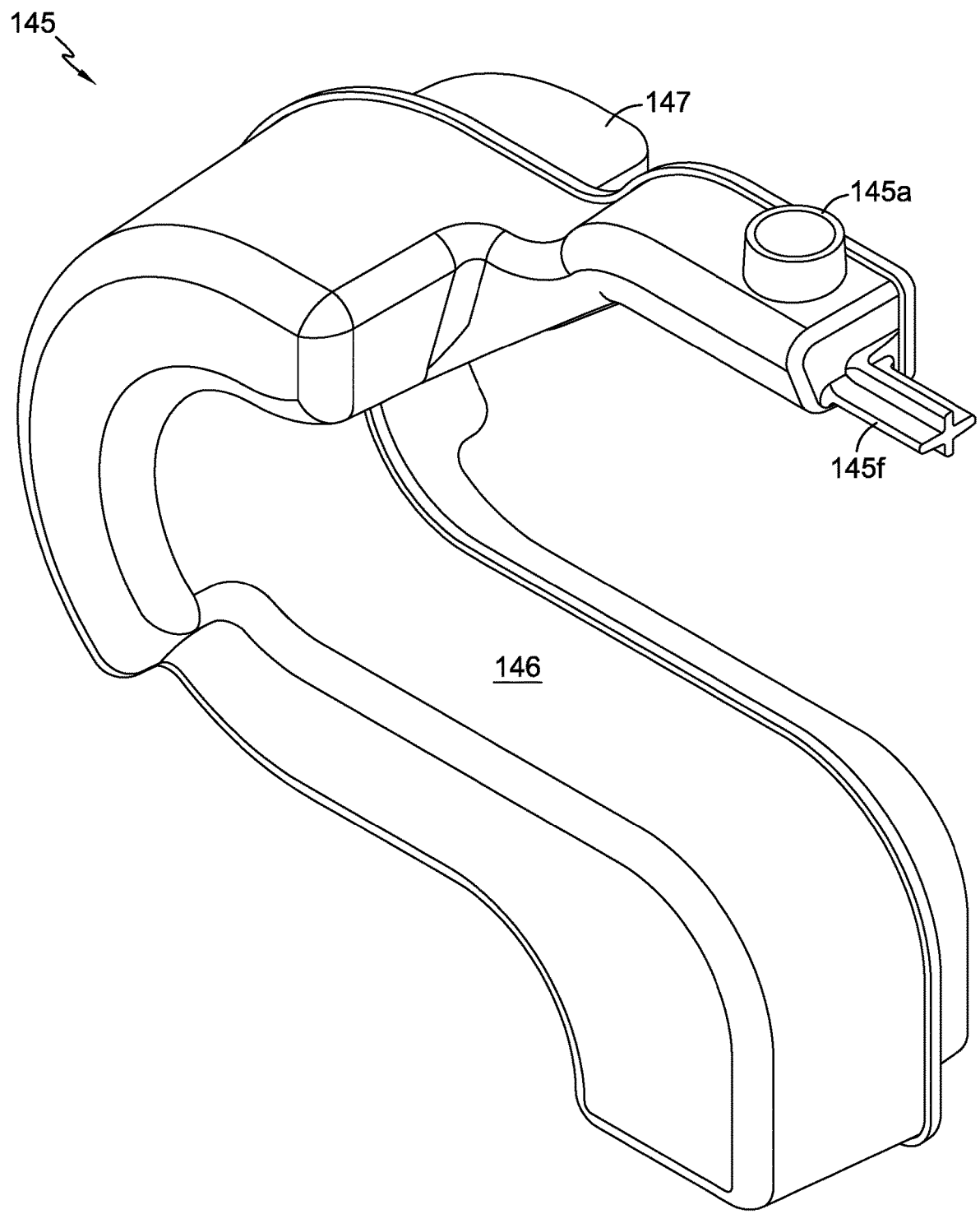
FIG. 17 is a perspective view of the internal expansion tank of FIG. 15, rotated 180 degrees about a vertical axis.
Figure 18:
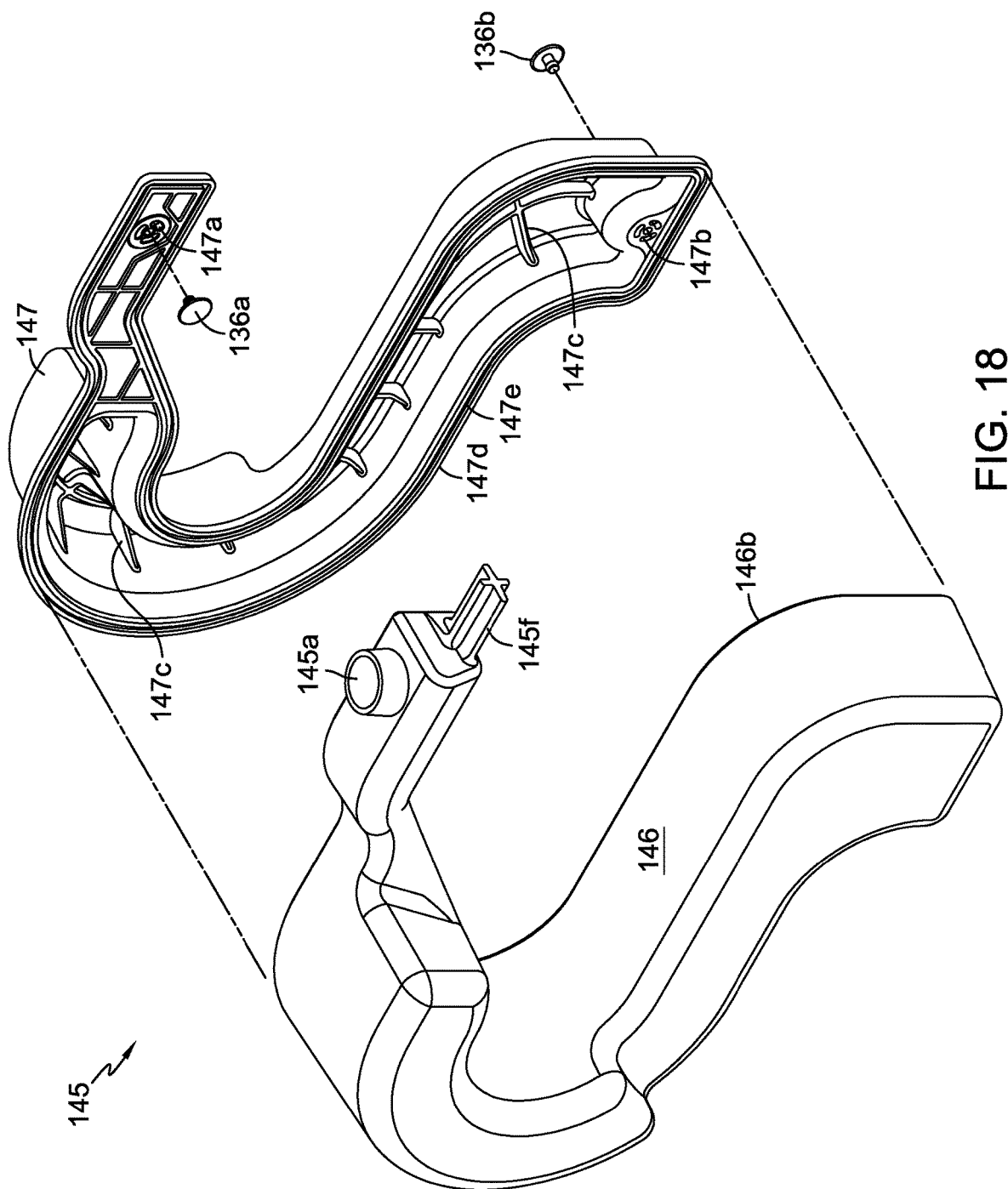
FIG. 18 is an exploded perspective view of the internal expansion tank of FIG. 17.
Figure 19:
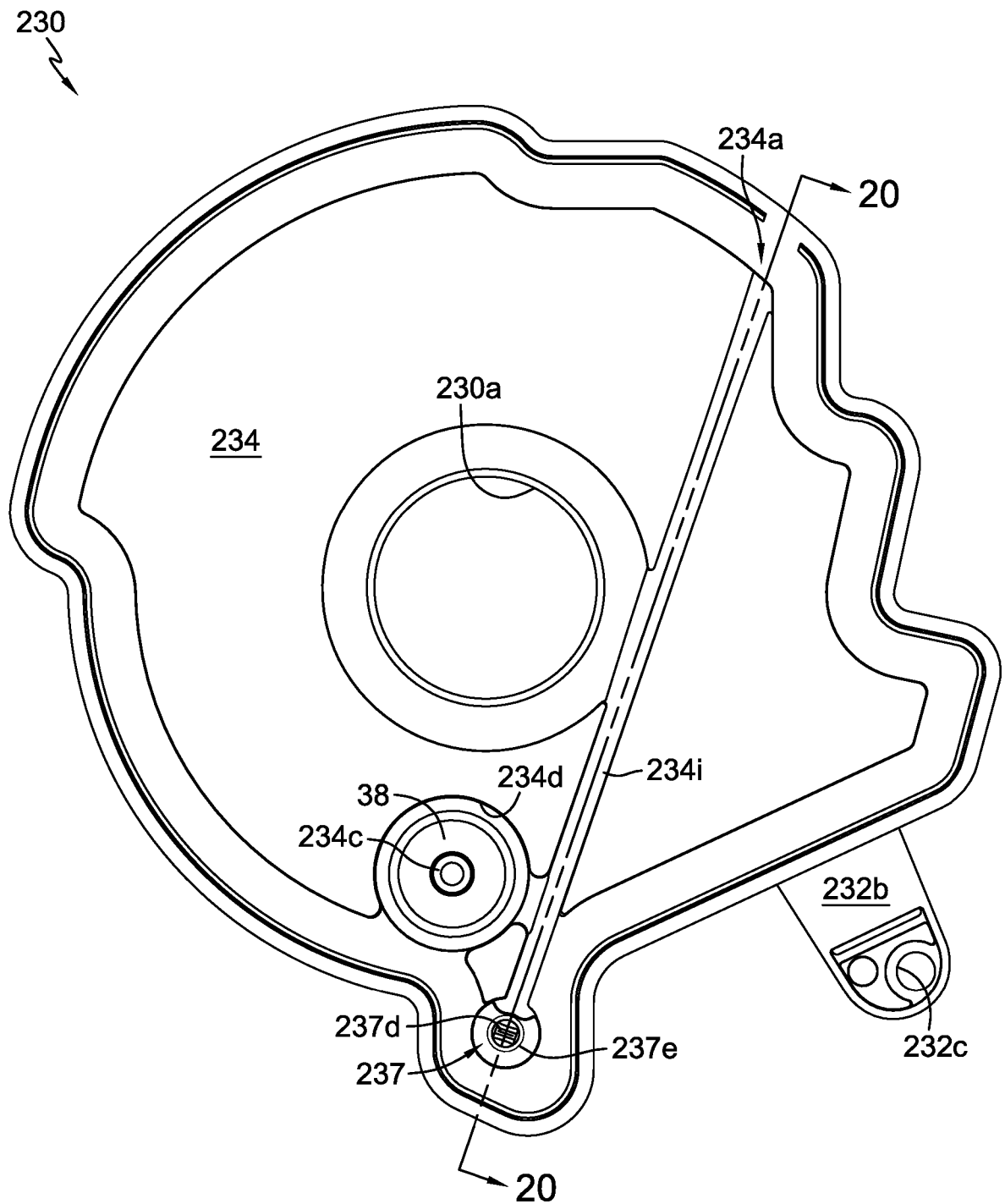
FIG. 19 is an elevational view of a third embodiment of an internal expansion tank similar in basic form to that shown in FIG. 4, and which can also be mounted in a housing member of a transaxle such as that shown in FIG. 2.
Figure 20:
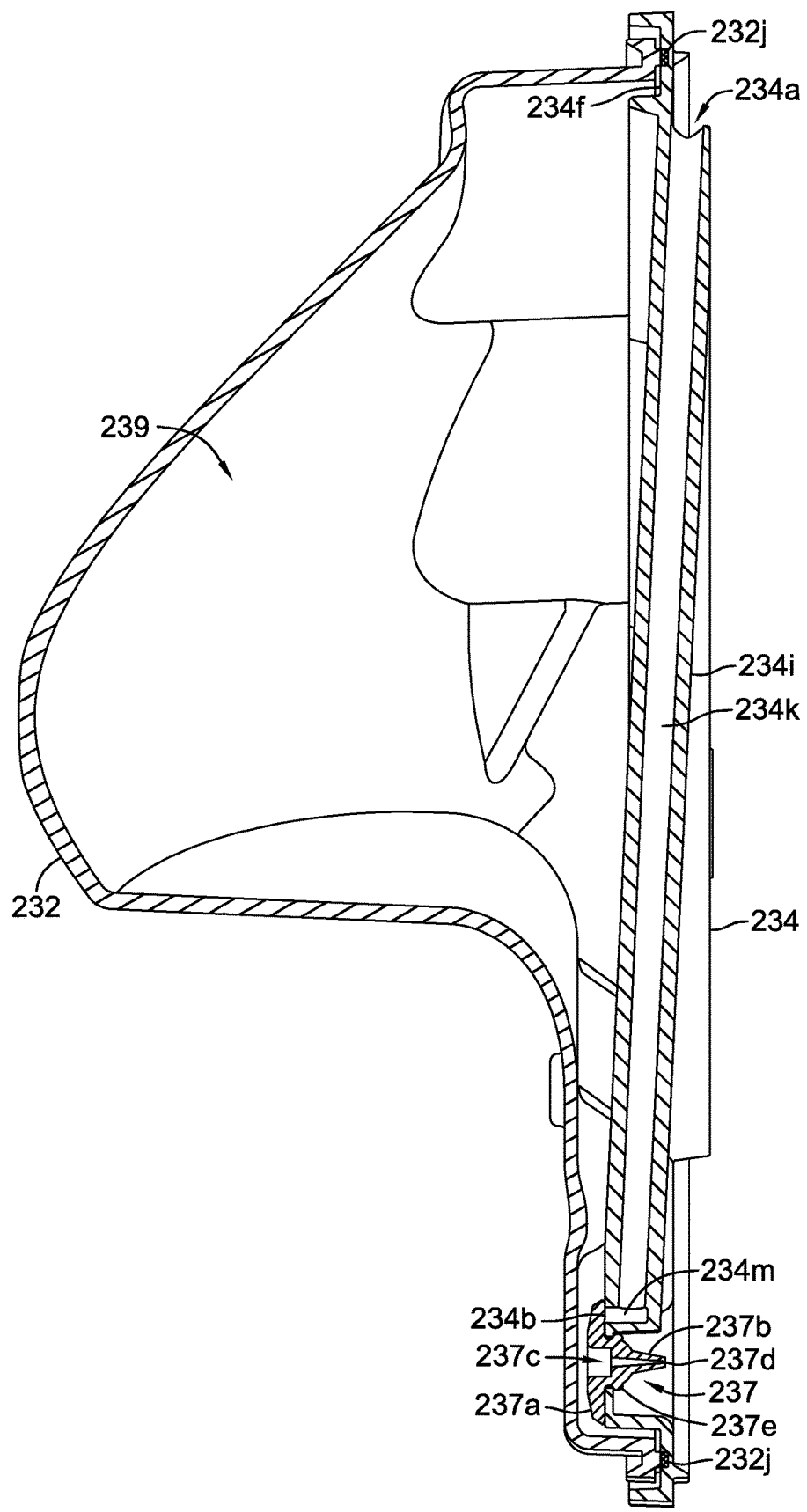
FIG. 20 is a cross-sectional view of the internal expansion tank of FIG. 19, along the line 20-20 in FIG. 19.
Figure 21:
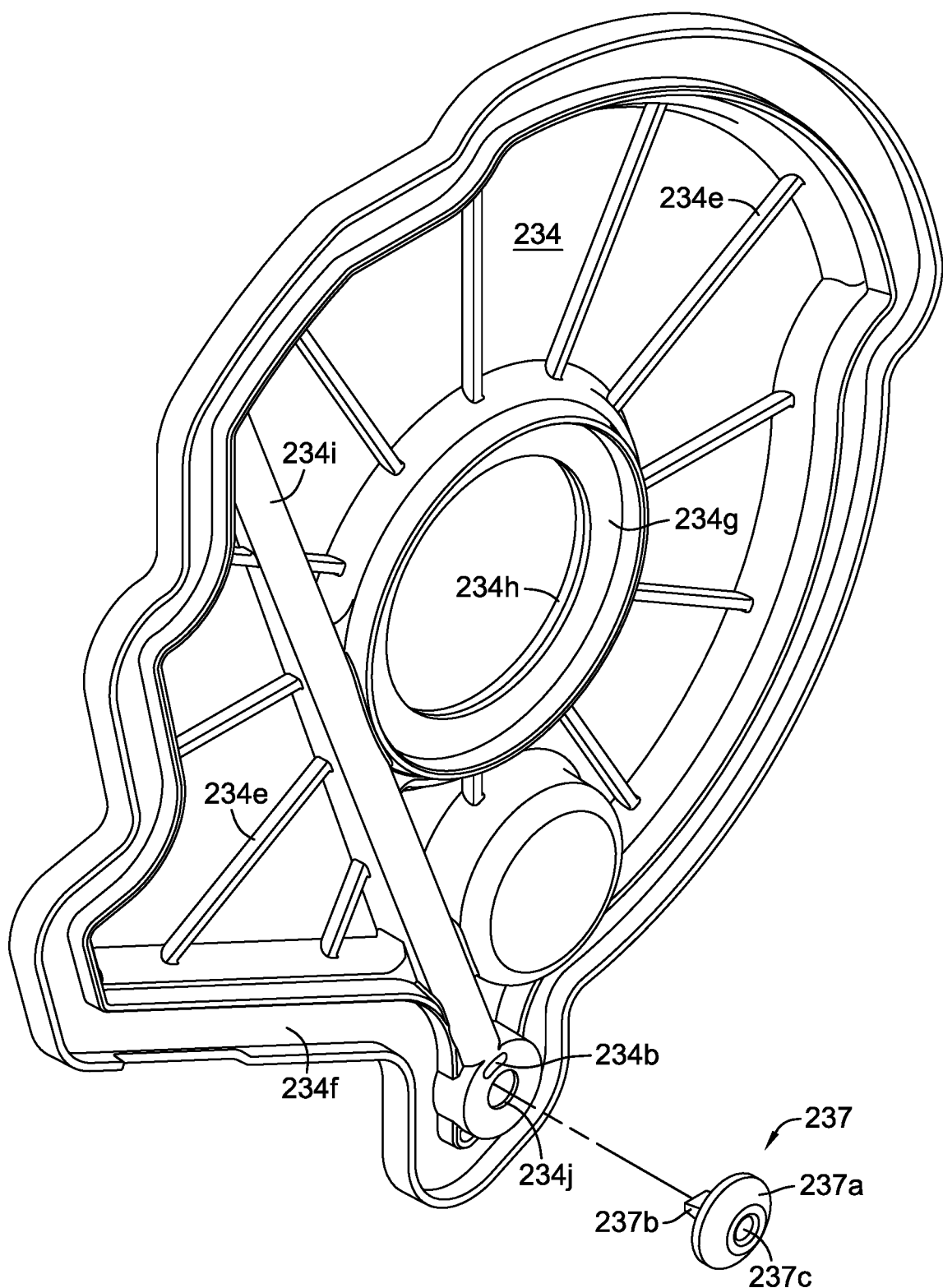
FIG. 21 is an exploded perspective view of a cover and valve of the internal expansion tank of FIG. 19.
Figure 22:
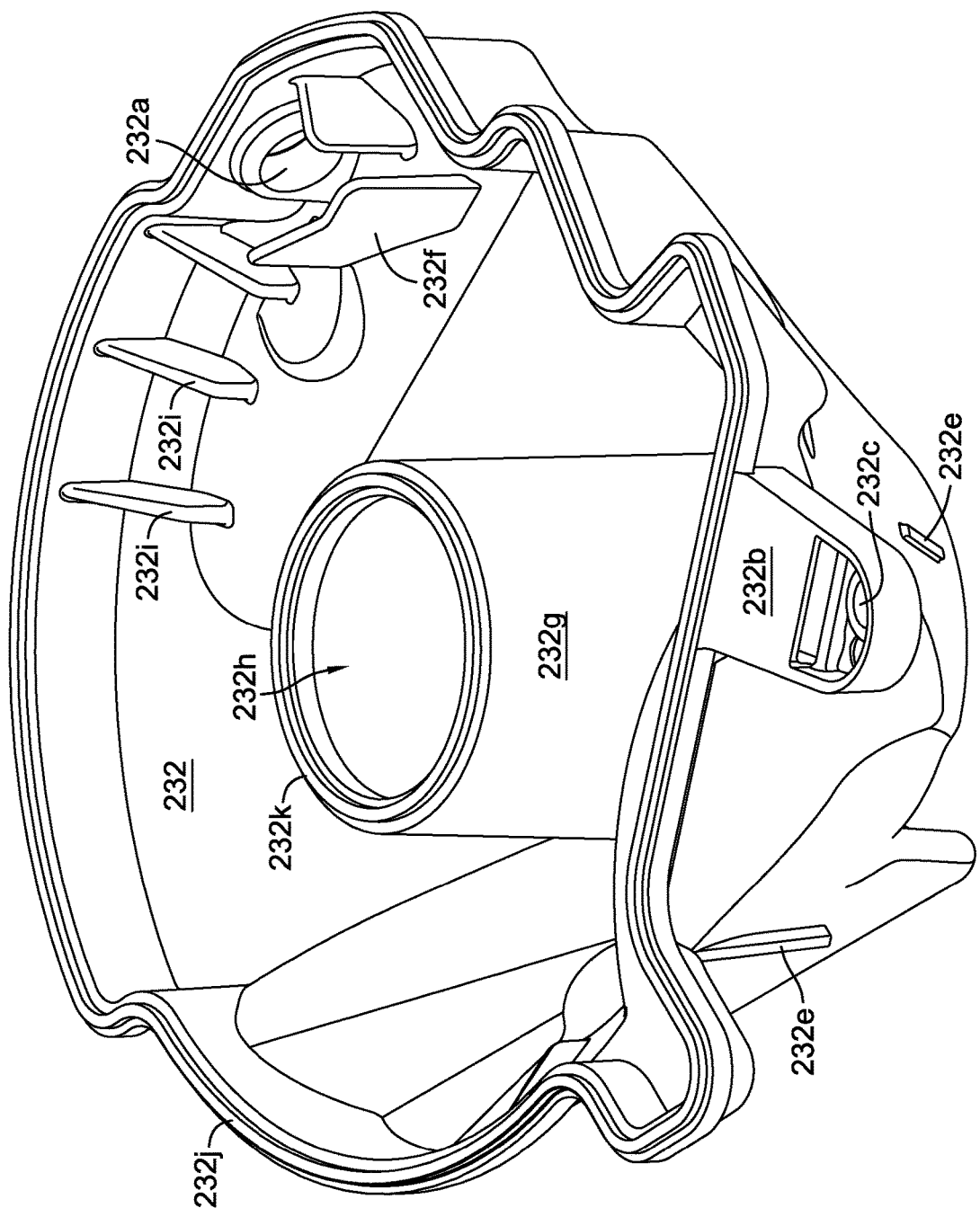
FIG. 22 is a perspective view of the main body of the internal expansion tank of FIG. 19.

Another drive device 116 having a further embodiment of an internal expansion tank 145 is shown in FIGS. 11-18. Expansion tank 145 functions in the same manner and shares certain characteristics and components of internal expansion tank 30. A drive device such as that shown in FIGS. 11-13 is found in commonly-owned U.S. Pat. Nos. 8,464,610 and 9,856,969, the disclosures of which are incorporated herein by reference. An internal expansion tank having a shape similar to that of internal expansion tank 145 is described in commonly-owned U.S. patent application Ser. No. 15/347,136, the disclosure of which is incorporated herein by reference.

Exemplary drive device 116, shown in FIGS. 11-13, is an IHT having a first housing member 152 and a second housing member 154 joined via fasteners 118 to form an internal sump 120. Drive device 116 is driven by an input pulley 132 and has two output axles 168, 170 that can be rotated independently at different speeds both clockwise and counterclockwise in order to steer a vehicle such as a snow thrower.

A vent assembly 176 is installed in a vent port 178 that also receives a vent stem 145a formed at the top of the internal expansion tank 145 so that expansion tank 145 is in communication with atmosphere, the vent stem 145a comprising an opening to an internal volume 139 of expansion tank 30. Vent stem 145a is formed at the upper end of a neck 145b that extends upward from the main body of expansion tank 145. In the depicted embodiment, neck 145b extends adjacent to and above a clutch assembly 161 supported on a shaft 167. A projection 145f extends from neck 145b to interface with an internal mounting member such as center section 138 (a mating portion of which is represented in phantom) to retain neck 145b in position and prevent disengagement of stem 145a from vent port 178. Center section 138 may be a hydraulic mounting member having running surfaces for a hydraulic pump and motor and serves the same basic function as the previously described center section 50. Expansion tank 145 is nested in the space between a pair (one shown) of reduction gear sets 100 comprising a pair of reduction gears 101 and a pair of final output gears 104 that are drivingly engaged to the output axles 168, 170. A tank outer profile 145c of a portion of tank 145 closely follows an inner profile 154a of the second housing member 154 to help position and limit movement of tank 145. As illustrated, a gap may exist between tank outer profile 145c and inner profile 154a. Contact ribs similar to contact ribs 32e described previously herein can be added to stabilize tank 145 while maintaining an offset from second housing member 154 to provide more thermal transfer from sump 120 to atmosphere. Optionally, these profiles or a portion thereof may be nominally the same to help restrain tank 145. An inner profile 145d of a portion of tank 145 curves around a gear spacer 124 mounted on a jack shaft 102. Gear spacer 124 maintains separation between the pair of reduction gears 101 that are also mounted on and supported by jack shaft 102. Expansion tank 145 also includes at least one external support rib 145e (three shown) that interfaces with an output axles support structure 155 to further position and support tank 145.

As shown in FIGS. 14-18, expansion tank 145 is an assembly comprising a main body 146 and a cover 147 forming a tank body, an upper check valve 136a, and a lower check valve 136b. Main body 146 and cover 147 are preferably composed of a weldable plastic that can withstand the internal operating environment of drive device 116, and expansion tank 145 is capable of receiving hydraulic fluid from, and discharging hydraulic fluid to, internal sump 120. To enable this one-way fluid circuit, cover 147 includes at least one upper fluid flow opening 147a to accommodate fluid flow into expansion tank 145, and at least one lower fluid flow opening 147b to accommodate fluid flow out of expansion tank 145. In the illustrated embodiment, the upper and lower fluid flow openings 147a, 147b comprise an array of three small openings associated with each umbrella-style check valve 136a, 136b. As in the previous embodiment, it is preferred that the fluid level 120a in the internal volume 139 of expansion tank 145 remains above the lower check valve 136b as it rises and falls, so that air is not pulled into sump 120.

The upper check valve 136a is installed on the inner surface of cover 147 in conjunction with upper fluid flow opening(s) 147a, and the lower check valve 136b is installed on the outer surface of cover 147 in conjunction with lower fluid flow opening(s) 147b. Simple, low-cost, umbrella-style check valves 136a, 136b are shown, but other check valves providing the same one-way fluid flow function could be used.

Stiffening ribs 146a are provided on main body 146 to improve structural integrity and minimize warping. Stiffening ribs 147c are also provided on cover 147 for the same purpose. The stiffening ribs 146a, 147c also facilitate ease of assembly of expansion tank 145 and serve as baffles to reduce sloshing. In the embodiment shown, a perimeter profile 146b of main body 146 joins with a mating groove 147e formed along the perimeter profile 147d of cover 147 for the assembly and welding (or otherwise joining and sealing) of expansion tank 145.

In an alternative embodiment (not shown), expansion tank 145 can be configured as an entirely snap-fit, non-welded assembly, wherein main body 146 and cover 147 are sealingly snap-fitted together. Additionally, the check valves 136a, 136b could be preassembled onto small snap-fit, removable parts having respective fluid flow opening(s) 147a, 147b formed therein, to enable serviceability of a thus modified expansion tank 145.

Figure 2:
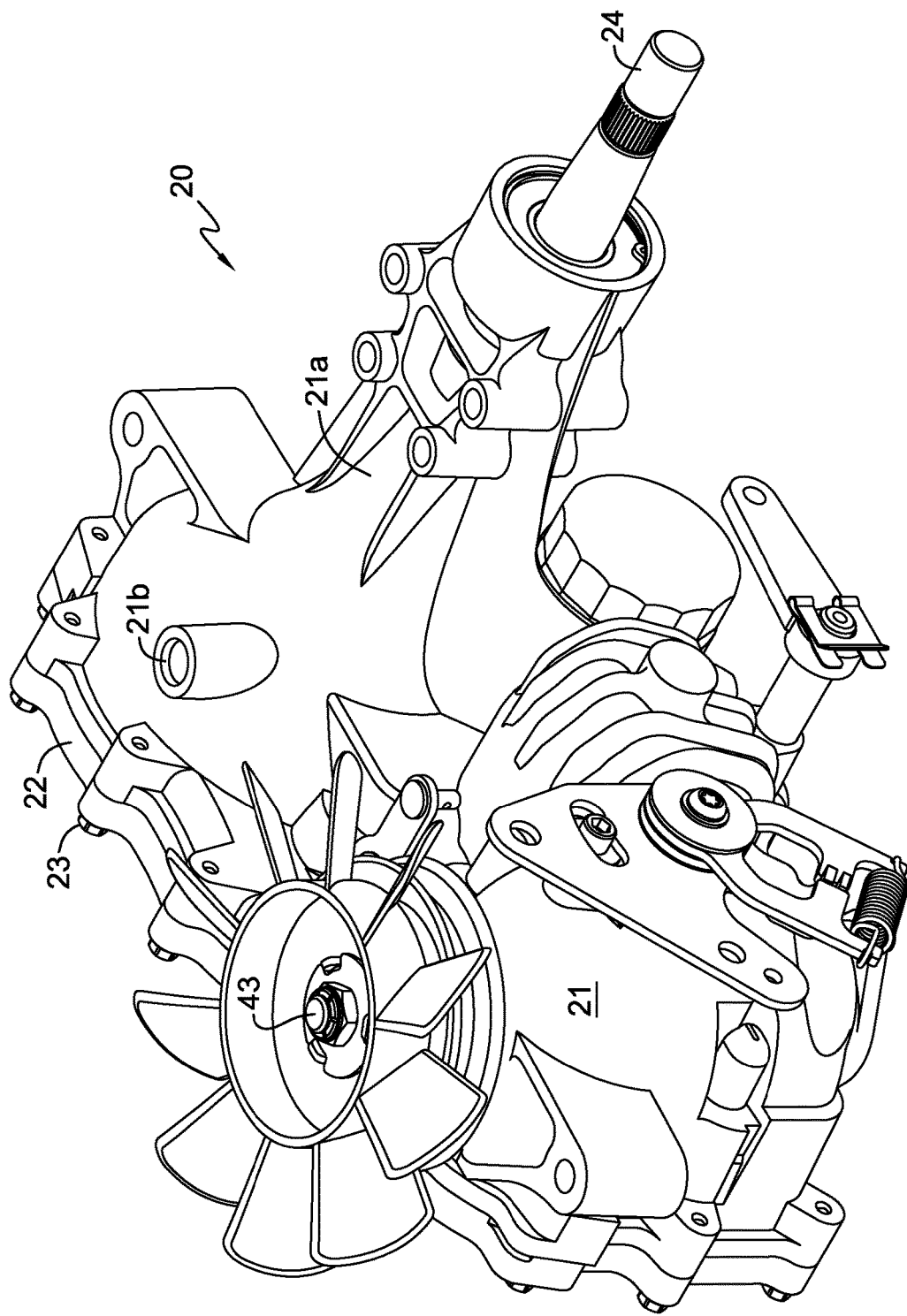
FIG. 2 is a perspective view of an exemplary hydraulic drive device for use with a first embodiment disclosed herein.
Figure 3:
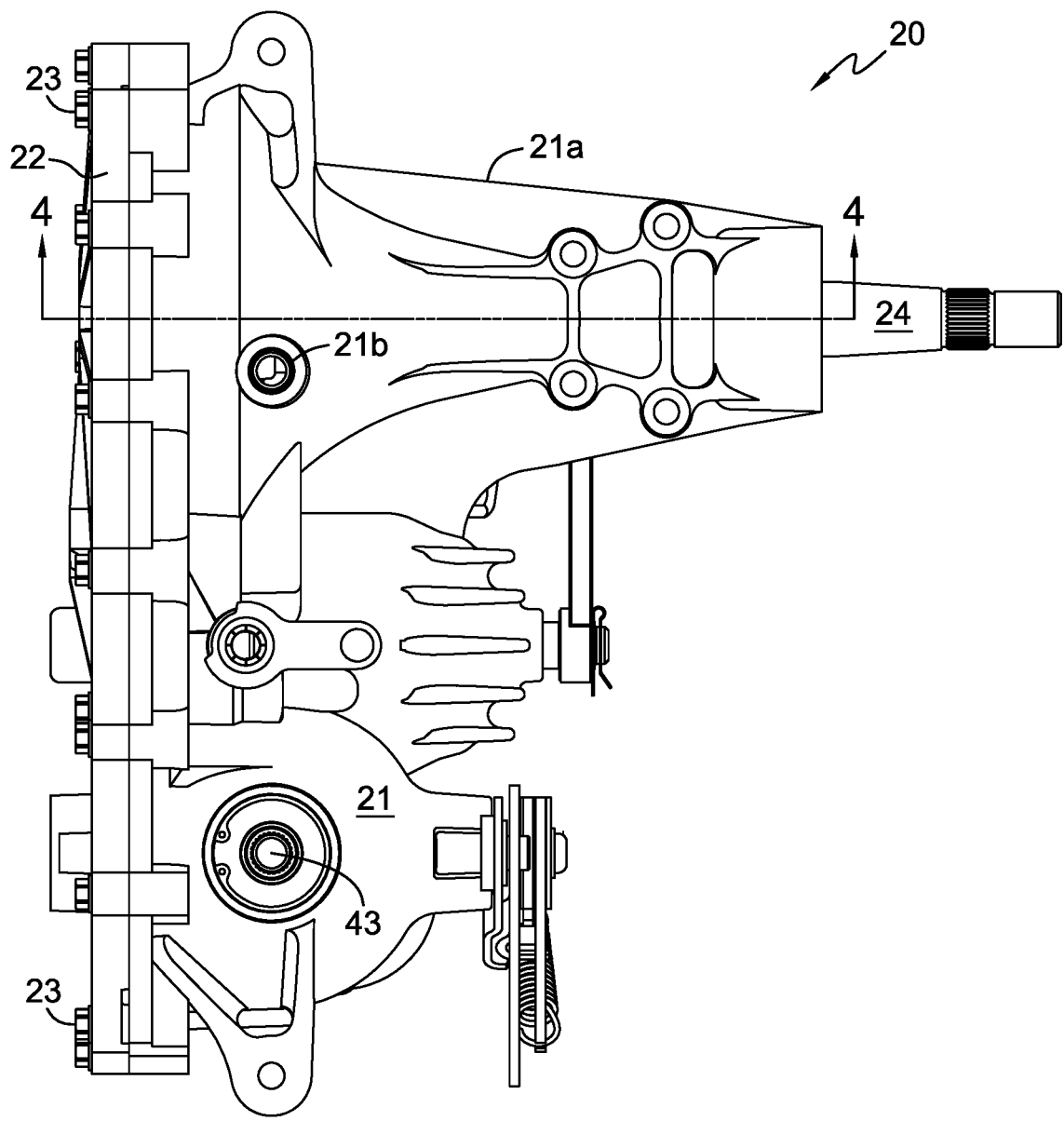
FIG. 3 is a top plan view of the drive device shown in FIG. 2.

A further embodiment of an expansion tank in accordance with the teachings herein is illustrated in FIGS. 19-22, where expansion tank 230 that is similar in many respects to the previously-described expansion tank 30 and can be used in the transaxle shown in, e.g., FIG. 2. Expansion tank 230 is an assembly comprising a main body 232, a cover 234, a duckbill-umbrella combination valve 237, and an optional magnet 38. Like expansion tank 30, main body 232 and cover 234 are preferably composed of a weldable synthetic polymer (plastic) that can withstand the internal operating environment of drive device or transaxle 20, and expansion tank 230 is capable of receiving the hydraulic fluid from, and discharging hydraulic fluid to, internal sump 25. Also similar to the previously described embodiments, expansion tank 230 comprises a vent opening 232a in communication with a vent of the drive device that is in communication with atmospheric pressure.

A fluid inlet tube 234i is integrally formed in the expansion tank cover 234, the fluid inlet tube 234i having an upper end comprising a fluid inlet or opening 234a in communication with the internal volume or sump 25 of transaxle 20 and a fluid outlet or opening 234b at its lower end in communication with the umbrella portion (i.e. flexible sealing flange 237a) of a duckbill-umbrella combination valve 237. The fluid inlet tube 234i and flexible sealing flange 237a allow fluid flow through opening 234b into expansion tank 230 during thermal expansion of the fluid and air in sump 25. It is preferred that a pressure differential of 2 psi would be sufficient to open the umbrella portion of valve 237 in such a manner. As the fluid in transaxle 20 cools, the flexible sealing flange 237a seals the opening 234b and the duckbill portion of the combination valve 237 (comprising a duckbill stem 237b having a fluid inlet opening 237c in communication with the expansion tank internal volume 239 and a duckbill fluid outlet opening 237d in communication with sump 25) allows fluid flow out of expansion tank 230 and into sump 25. It is preferred that a pressure differential of 1 psi be sufficient to open the duckbill valve portion of valve 237 during the cooling phase of the temperature cycle. Similar to the first embodiment, it is preferred that the fluid level in the internal volume 239 of expansion tank 230 remains above the combination valve 237 as it rises and falls, so that air is not pulled into sump 25 during the cooling phase of the temperature cycle. During manufacture, a specified volume of oil is added to sump 25 and to expansion tank 230 to ensure that this minimum fluid level is maintained during operation of transaxle 20.

Like expansion tank 30, expansion tank 230 includes an alignment extension 232b comprising an alignment opening 232c that engages a protrusion 21c formed on main housing 21. The expansion tank main body 232 also includes a plurality of housing contact ribs 232e that serve to locate and prevent excessive movement of expansion tank 230. These locating features serve to secure expansion tank 230 such that an axle clearance opening 230a that extends through the assembled expansion tank 230 is approximately aligned concentrically and axially with the axle opening 21d. The optional magnet 38 is secured on post 234c in pocket 234d proximate to the duckbill-umbrella combination valve 237 to trap ferrous particles both inside and outside of expansion tank 230. The combination valve 237 has on integral O-ring form 237e that is pushed through a valve mounting opening 234j formed in cover 234 during valve installation. The integral O-ring form 237e secures the combination valve 237 in the mounting opening 234j such that the flexible flange 237a is sealingly seated over the internal opening 234b and the duckbill opening 237d of combination valve 237 is exposed to sump 25 on the external side of cover 234. The internal opening 234b is connected via fluid passage 234m to fluid passage 234k of the integrally formed inlet tube 234i, which is connected to the fluid inlet or opening 234a.

The expansion tank main body 232 includes a cylindrical or tube-like conical structure 232g having an opening 232h formed therethrough (to accommodate axle 24) and a circular welding ridge 232k formed thereon. Main body 232 also includes a welding ridge 232j formed about its perimeter. Cover 234 includes a circular weld mating surface 234g that has an opening 234h formed therethrough (to accommodate axle 24) and also includes a welding groove 234f formed about its perimeter. During manufacture, the mating weldment structures (circular welding ridge 232k and mating surface 234g; perimeter welding ridge 232j and perimeter welding groove 234f) are welded (e.g. friction welded) or otherwise sealingly joined during assembly to form the expansion tank internal volume 239. Stiffening ribs 234e are provided on cover 234 and stiffening ribs 232i are provided on main body 232 to improve structural integrity and minimize warping. An optional internal view obstruction or barrier 232f may be provided near the vent opening 232a to help discourage oil addition to the expansion tank 230 during servicing of transaxle 20 by preventing a view of the oil level. A tamper-resistant vent may also be installed on the drive device as a further deterrent to unintentional or errant overfilling of the expansion tank 230.

Figure 23:
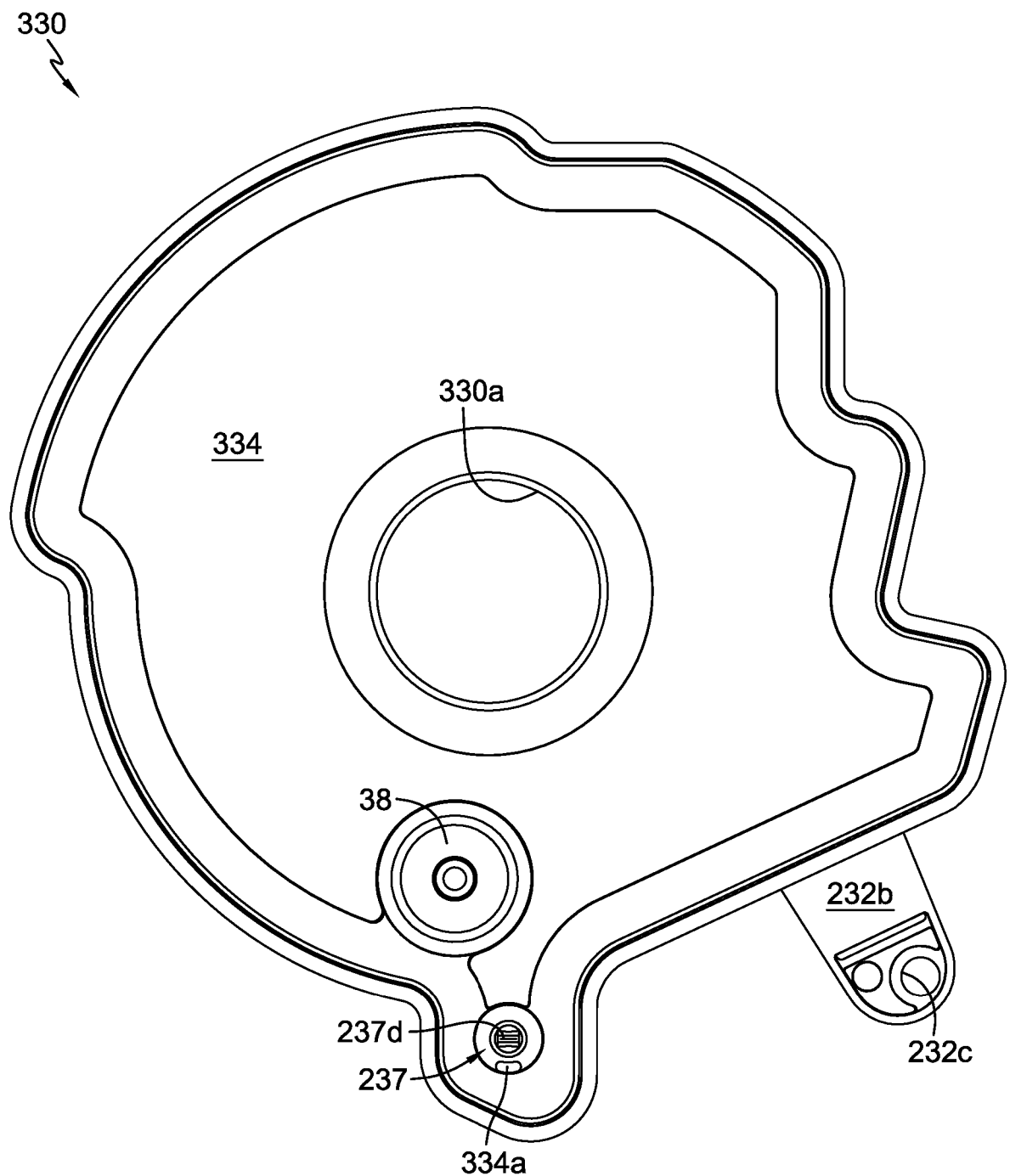
FIG. 23 is an elevational view of an expansion tank similar to that shown in FIG. 19, which can also be mounted in a housing member of a transaxle such as that shown in FIG. 2.

In FIG. 23, expansion tank 330 is an assembly comprising a main body 232, a cover 334, a duckbill-umbrella combination valve 237, and an optional magnet 38. Like expansion tank 230, main body 232 and cover 334 are preferably composed of a weldable synthetic polymer (plastic) that can withstand the internal operating environment of drive device or transaxle 20, and expansion tank 330 is capable of receiving the hydraulic fluid from, and discharging hydraulic fluid to, internal sump 25. Expansion tank 330 is essentially the same as expansion tank 230, including an axle clearance opening 330a that extends through the assembled expansion tank 330 for axle clearance, but without the integrally formed inlet tube 234i of cover 234. This omission may result in a less complex and less costly cover 334, but expansion tank 330 may be less efficient at reducing entrained air. Rather than having an upper inlet opening such as the fluid inlet or opening 234a of cover 234, cover 334 may have one or more inlet openings 334a (one shown) formed through cover 334 directly adjacent to the flexible sealing flange 237a.

Figure 24:
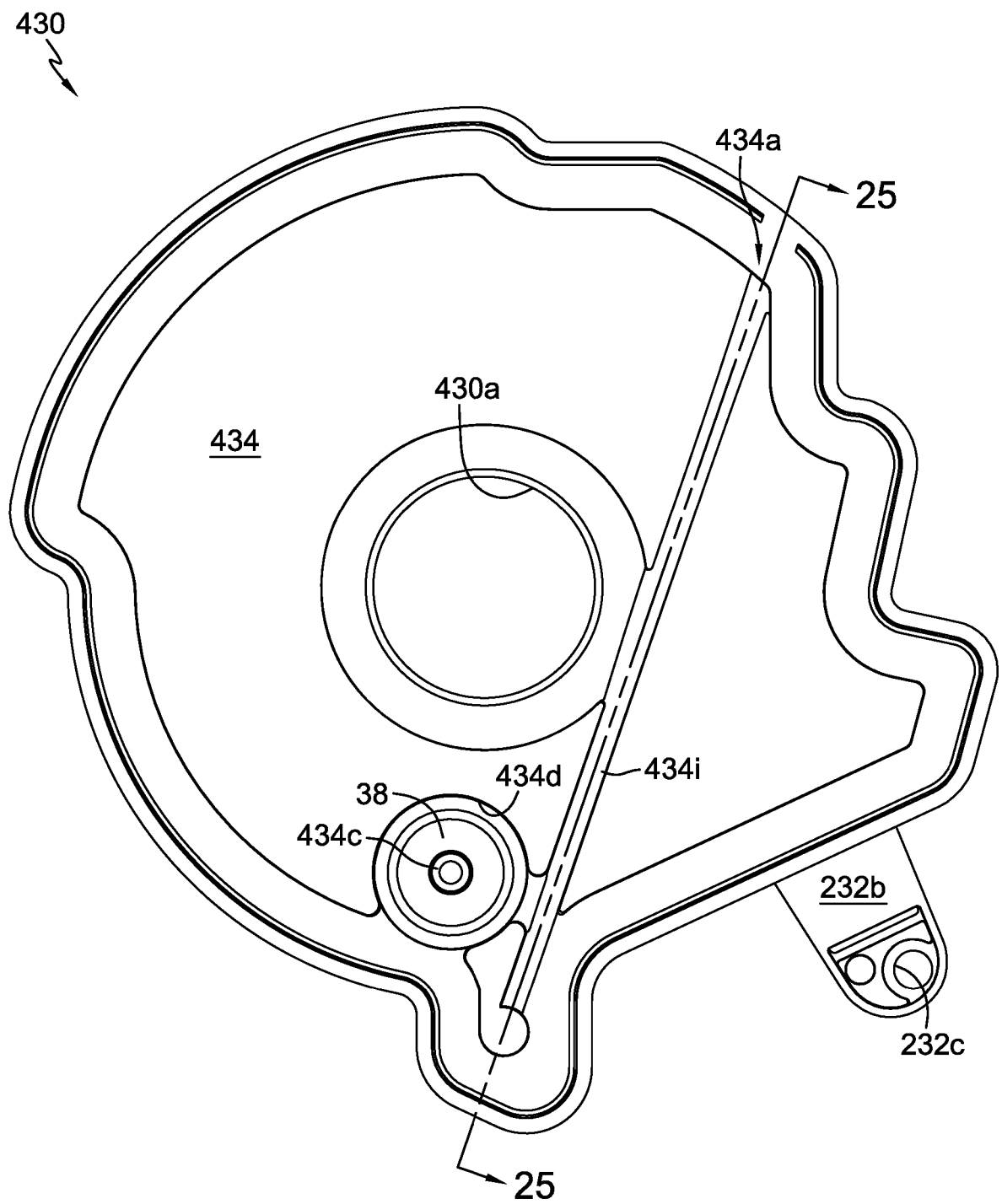
FIG. 24 is an elevational view of a further embodiment of an internal expansion tank similar to that shown in FIG. 19, and which can also be mounted in a housing member of a transaxle such as that shown in FIG. 2.
Figure 25:
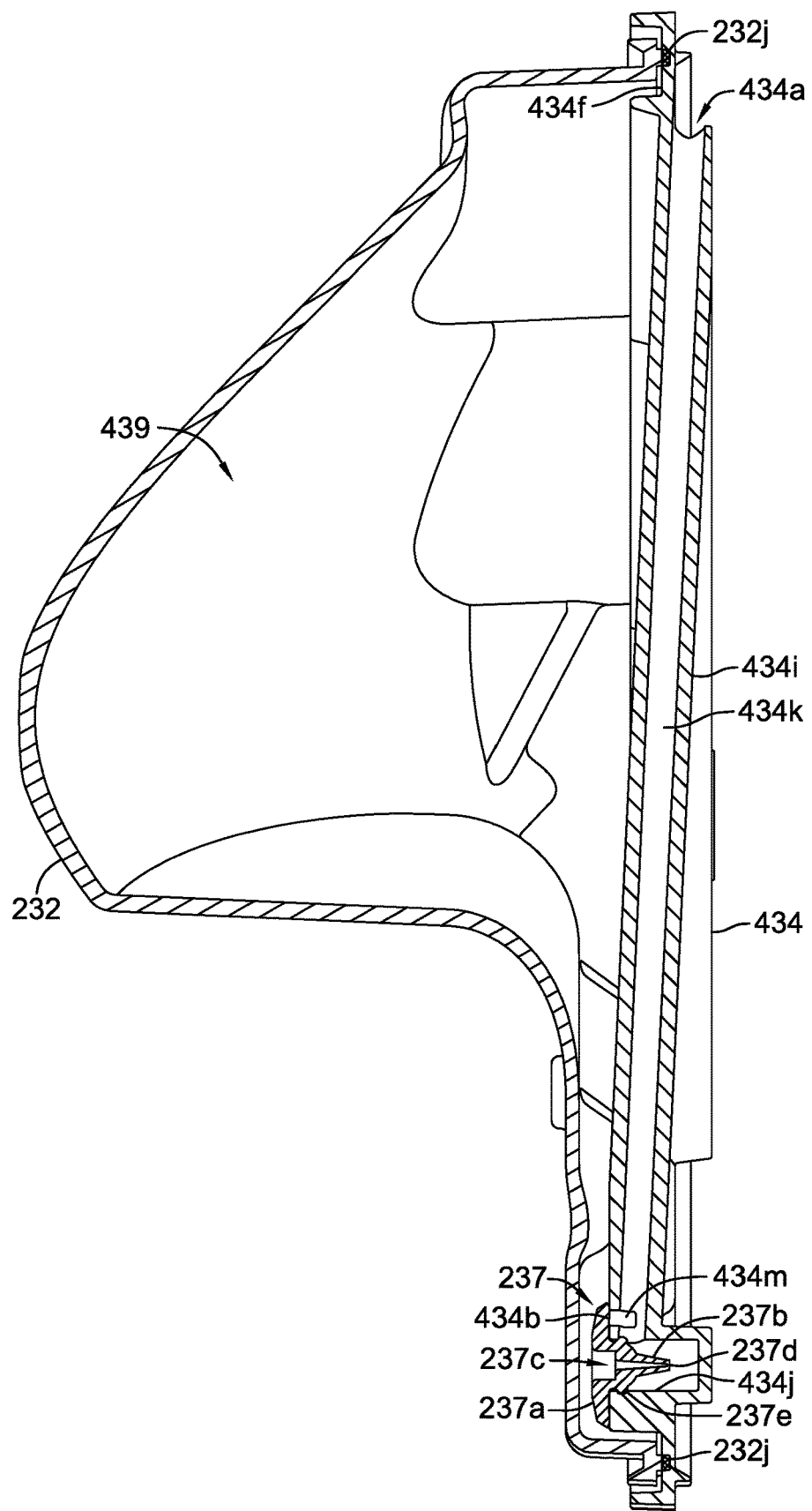
FIG. 25 is a cross-sectional view of the internal expansion tank of FIG. 24, along the line 25-25 in FIG. 24.
Figure 26:
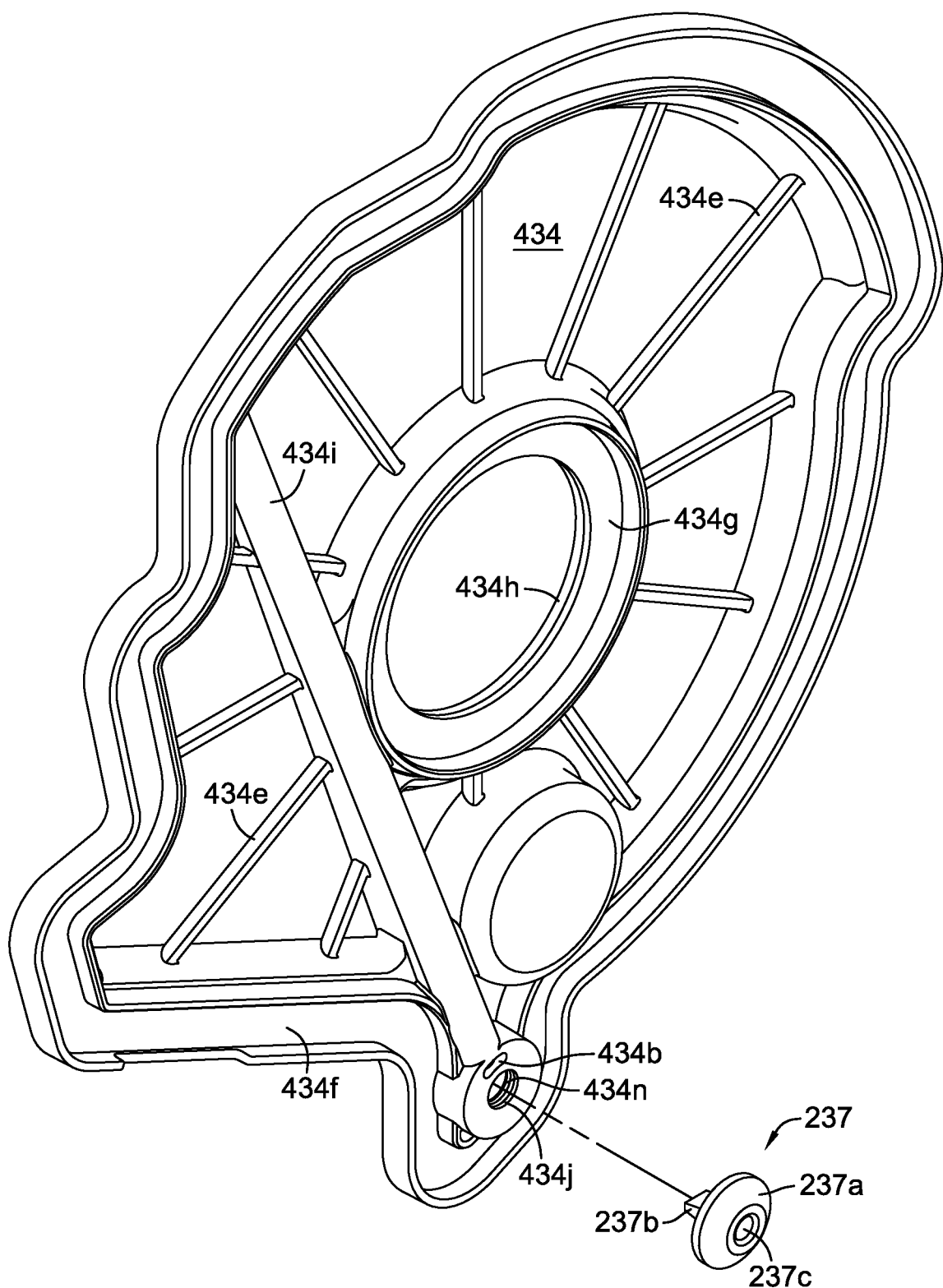
FIG. 26 is an exploded perspective view of a cover and valve of the internal expansion tank of FIG. 24.

A further embodiment of an expansion tank in accordance with the teachings herein is illustrated in FIGS. 24-26, where expansion tank 430 that is similar in many respects to the previously-described expansion tank 230 and can also be used in the transaxle shown in, e.g., FIG. 2. Expansion tank 430 is an assembly comprising a main body 232, a cover 434, a duckbill-umbrella combination valve 237, and an optional magnet 38. Like expansion tank 230, main body 232 and cover 434 are preferably composed of a weldable synthetic polymer (plastic) that can withstand the internal operating environment of drive device or transaxle 20, and expansion tank 430 is capable of receiving the hydraulic fluid from, and discharging hydraulic fluid to, internal sump 25. Also similar to previously described expansion tank 230, expansion tank 430 comprises a vent opening 232a in communication with a vent of the drive device that is in communication with atmospheric pressure. Expansion tank 430 is secured in transaxle 20 such that an axle clearance opening 430a that extends through the assembled expansion tank 430 is approximately aligned concentrically and axially with the axle opening 21d.

In this embodiment, an integrally formed riser tube 434i serves as both the inlet passage to the expansion tank and the outlet passage from the expansion tank. The riser tube 434i has an upper end comprising a fluid inlet or opening 434a in communication with the internal volume or sump 25 of transaxle 20 and a fluid outlet or opening 434b at its lower end in communication with the umbrella portion (i.e. flexible sealing flange 237a) of a duckbill-umbrella combination valve 237. The riser tube 434i and flexible sealing flange 237a allow fluid flow through opening 434b and into the internal volume 439 of expansion tank 430 during thermal expansion of the fluid and air in sump 25. As the fluid in transaxle 20 cools, the flexible sealing flange 237a seals the opening 434b and fluid flows from the internal volume 439 into fluid inlet opening 237c, through the duckbill portion 237b of the combination valve 237, out of duckbill opening 237d, through fluid passage 434k of the riser tube 434i and back into sump 25. The same preferred pressure differentials with regard to valve 237 described above would apply here as well, but it will be understood that the design of expansion tank 230 and cover 234 in FIGS. 19-22 would demonstrate improved evacuation of the expansion tank compared to the design of expansion tank 430 and cover 434 shown in FIGS. 24-26.

The combination valve 237 has on integral O-ring form 237e that is pushed into a groove 434n machined or formed in an internal valve mounting pocket 434j of cover 434 during valve installation. When the combination valve 237 is installed in the mounting pocket 434j, the flexible flange 237a is sealingly seated over the internal opening 434b and the duckbill opening 237d of combination valve 237 is exposed to the valve mounting pocket 434j that is in communication with fluid passage 434k. The internal opening 434b is connected via fluid passage 434m to fluid passage 434k, which is connected to the fluid inlet or opening 434a. The optional magnet 38 is secured on post 434c in pocket 434d proximate to the internally mounted duckbill-umbrella combination valve 237 to trap ferrous particles both inside and outside of expansion tank 430.

Like cover 234, cover 434 includes a circular weld mating surface 434g that has an opening 434h formed therethrough (to accommodate axle 24) and also includes a welding groove 434f formed about its perimeter. During manufacture, the mating weldment structures (circular welding ridge 232k and mating surface 434g; perimeter welding ridge 232j and perimeter welding groove 434f) are welded (e.g. friction welded) or otherwise sealingly joined during assembly to form the expansion tank internal volume 439. Stiffening ribs 434e are provided on cover 434 to improve structural integrity and minimize warping.

The expansion tanks 230, 330 and 430 each benefit from the use of a single 2-way valve (i.e. duckbill-umbrella combination valve 237) that is always submerged in oil. This may prove advantageous as compared to an expansion tank having an upper and lower umbrella valve where the upper umbrella valve (e.g. upper umbrella valve 36a) may at times be exposed to an air-rich mixture of oil and air in some applications. Greater air flow and reduced oil flow through the upper umbrella valve may result in particle contamination under the flexible flange 237a and compromised sealing integrity which could reduce the effectiveness of this upper check valve. Conversely, a lower valve position may be beneficial due to submersion in oil that may result in improved debris tolerance of the flexible flange type valves described herein.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. An expansion tank for use with a drive device having a housing forming a sump containing hydraulic fluid, the expansion tank comprising:
   a tank body disposed in the sump and defining an internal expansion volume;
   a fluid inlet tube disposed on the tank body and having a first, upper end open to the sump and a second, lower end open to the internal expansion volume; and
   a check valve disposed at the second, lower end of the fluid inlet tube to control fluid flow between the sump and the internal expansion volume, wherein fluid enters the internal expansion volume from the sump when the pressure in the sump exceeds the pressure in the internal expansion volume by a first predetermined amount, and fluid exits the internal expansion volume to the sump when the pressure in the internal expansion volume exceeds the pressure in the sump by a second predetermined amount.

2. The expansion tank of claim 1, wherein the check valve comprises an umbrella valve that opens to permit fluid to enter the internal expansion volume from the sump when the pressure in the sump exceeds the pressure in the internal expansion volume by the first predetermined amount, and a duckbill valve that opens to permit fluid to exit the internal expansion volume to the sump when the pressure in the internal expansion volume exceeds the pressure in the sump by the second predetermined amount.

3. The expansion tank of claim 1, wherein the tank body further comprises a main body and a cover, and the check valve is disposed on the cover, and the cover comprises an opening directly adjacent the check valve to permit fluid to flow from the internal expansion volume through the check valve and directly to the sump.

4. The expansion tank of claim 3, wherein the check valve comprises an umbrella valve that opens to permit fluid to enter the internal expansion volume from the sump when the pressure in the sump exceeds the pressure in the internal expansion volume by the first predetermined amount, and a duckbill valve that opens to permit fluid to exit the internal expansion volume to the sump when the pressure in the internal expansion volume exceeds the pressure in the sump by the second predetermined amount.

5. The expansion tank of claim 4, wherein the tank body defines an axle opening to accommodate an output axle of the drive device extending through the expansion tank.

6. The expansion tank of claim 1, wherein the tank body further comprises a main body and a cover, and the check valve is disposed on the cover, wherein the cover is sealed adjacent the check valve, whereby when fluid flows through the check valve to the sump, the fluid first passes through the fluid inlet tube to return to the sump.

7. The expansion tank of claim 6, wherein the check valve comprises an umbrella valve that opens to permit fluid to enter the internal expansion volume from the sump when the pressure in the sump exceeds the pressure in the internal expansion volume by the first predetermined amount, and a duckbill valve that opens to permit fluid to exit the internal expansion volume to the sump when the pressure in the internal expansion volume exceeds the pressure in the sump by the second predetermined amount.

8. The expansion tank of claim 6, wherein the main body and the cover define an opening to accommodate an output axle of the drive device extending through the expansion tank.

9. The expansion tank of claim 1, wherein the tank body further comprises an upwardly extending vent stem in fluid communication with atmospheric pressure.

10. An expansion tank for use with a drive device having a sump containing hydraulic fluid, the expansion tank comprising:
- a tank body disposed in the sump and comprising a main body and a cover engaged thereto to define an internal expansion volume;
- a fluid inlet tube disposed on the cover and having a first, upper end open to the sump and a second, lower end open to the internal expansion volume;
- a combination valve disposed at the second, lower end of the fluid inlet tube to control fluid flow between the sump and the internal expansion volume, the combination valve comprising an umbrella valve that opens to permit fluid to enter the internal expansion volume from the sump when the pressure in the sump exceeds the pressure in the internal expansion volume by a first predetermined amount, and a duckbill valve that opens to permit fluid to exit the internal expansion volume to the sump when the pressure in the internal expansion volume exceeds the pressure in the sump by a second predetermined amount.

11. The expansion tank of claim 10, wherein the cover further comprises an opening directly adjacent the duckbill valve to permit fluid to flow from the duckbill valve to the sump.

12. The expansion tank of claim 11, wherein the main body and the cover define an axle opening to accommodate an output axle of the drive device extending through the expansion tank.

13. The expansion tank of claim 11, wherein the main body further comprises an upwardly extending vent stem in fluid communication with atmospheric pressure and an outwardly extending projection.

14. The expansion tank of claim 10, wherein the cover is sealed adjacent the combination valve, whereby when fluid flows from the internal expansion volume through the duckbill valve, the fluid first passes through the fluid inlet tube to return to the sump.

15. The expansion tank of claim 14, wherein the main body and the cover define an opening to accommodate an output axle of the drive device extending through the expansion tank.

16. The expansion tank of claim 14, wherein the main body further comprises an upwardly extending vent stem in fluid communication with atmospheric pressure.

17. The expansion tank of claim 10, further comprising an alignment extension to engage a protrusion formed on a housing of the drive device.

18. The expansion tank of claim 10, further comprising a plurality of stiffening ribs formed on an internal surface of the cover.

19. The expansion tank of claim 10, further comprising a magnet disposed on the cover.

20. An expansion tank for use with a drive device having a housing forming a sump containing hydraulic fluid, the expansion tank comprising:
- a tank body disposed in the sump and defining an internal expansion volume;
- a fluid inlet tube disposed on the tank body and having a first, upper end open to the sump and a second, lower end open to the internal expansion volume; and
- a combination umbrella valve and duckbill valve disposed at the second, lower end of the fluid inlet tube to control fluid between the sump and the internal expansion volume, wherein fluid enters the internal expansion volume from the fluid inlet tube through the umbrella valve when the pressure in the sump exceeds the pressure in the internal expansion volume by a first predetermined amount, and fluid exits the internal expansion volume through the duckbill valve and directly to the sump when the pressure in the internal expansion volume exceeds the pressure in the sump by a second predetermined amount.

* * * * *